United States Patent
Bai et al.

(10) Patent No.: US 12,185,124 B2
(45) Date of Patent: Dec. 31, 2024

(54) CANDIDATE BEAM SET UPDATE BASED ON DEFINED OR CONFIGURED NEIGHBORING BEAM SET

(71) Applicant: QUALCOMM Incorporated, San Diego, CA (US)

(72) Inventors: Tianyang Bai, Somerville, NJ (US); Hua Wang, Basking Ridge, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/661,252

(22) Filed: Apr. 28, 2022

(65) Prior Publication Data

US 2023/0354055 A1   Nov. 2, 2023

(51) Int. Cl.
*H04W 16/28*   (2009.01)
*H04W 72/044*   (2023.01)
*H04W 72/23*   (2023.01)
*H04W 76/20*   (2018.01)
*H04W 80/02*   (2009.01)

(52) U.S. Cl.
CPC ......... *H04W 16/28* (2013.01); *H04W 72/046* (2013.01); *H04W 72/23* (2023.01); *H04W 76/20* (2018.02); *H04W 80/02* (2013.01)

(58) Field of Classification Search
CPC ... H04W 16/28; H04W 72/046; H04W 72/23; H04W 76/20; H04W 80/02
See application file for complete search history.

(56) References Cited

U.S. PATENT DOCUMENTS

2024/0163970 A1*   5/2024   Kim ..................... H04W 80/08

FOREIGN PATENT DOCUMENTS

| CN | 115398839 B | * | 5/2024 | ........... H04L 1/1829 |
| WO | 2019075308 A1 | | 4/2019 | |
| WO | 2021212456 A1 | | 10/2021 | |
| WO | WO-2021230686 A1 | * | 11/2021 | ........... H04B 7/0626 |
| WO | WO-2022021426 A1 | * | 2/2022 | ........... H04L 1/1812 |

OTHER PUBLICATIONS

International Search Report and Written Opinion—PCT/US2023/019585—ISA/EPO—Aug. 1, 2023.

(Continued)

*Primary Examiner* — Michael A Keller
(74) *Attorney, Agent, or Firm* — Procopio, Cory, Hargreaves & Savitch LLP

(57) ABSTRACT

A user equipment (UE) communicates with a network node based on a first transmission configuration indication (TCI) state. The UE receives control information indicating a second TCI state from a TCI candidate set that comprises a list of TCI states that can be activated for future communication, the TCI candidate set including a first set of TCI states associated with the first TCI state. The UE updates, in response to receiving the control information indicating the second TCI state, the TCI candidate set to include a second set of TCI states that have a second association with the second TCI state.

30 Claims, 14 Drawing Sheets

(56) References Cited

OTHER PUBLICATIONS

3GPP: "3rd Generation Partnership Project, Technical Specification Group Radio Access Network, NR, Medium Access Control (MAC) Protocol Specification, (Release 17)", 3GPP TS 38.321, V17.0.0, Mar. 2022, 221 Pages, Sections 15.8.1 to 15.8.5, 16.1.3.12, 16.1.3.14, and 16.1.3.15.

3GPP: "3rd Generation Partnership Project, Technical Specification Group Radio Access Network, NR, Physical Layer Procedures for Data, (Release 17)", 3GPP TS 38.214, V17.1.0, Mar. 2022, 226 Pages, Section 5.1.5.

3GPP: "3rd Generation Partnership Project, Technical Specification Group Radio Access Network, NR, Radio Resource Control (RRC) Protocol Specification (Release 17)", TS 38.331, V17.0.0, Mar. 2022, 1221 Pages, pp. 852-854 of Section 6.3.2 (section 6.3.2—TCI-Info and -TCI-State).

\* cited by examiner

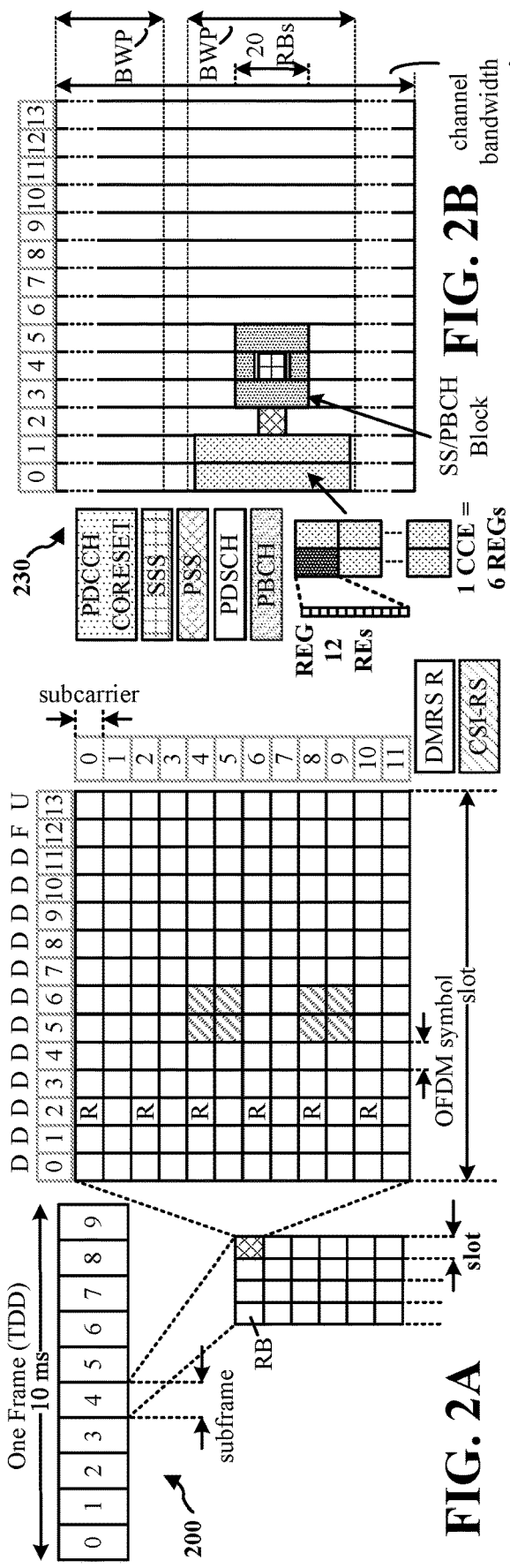
FIG. 2A
FIG. 2B
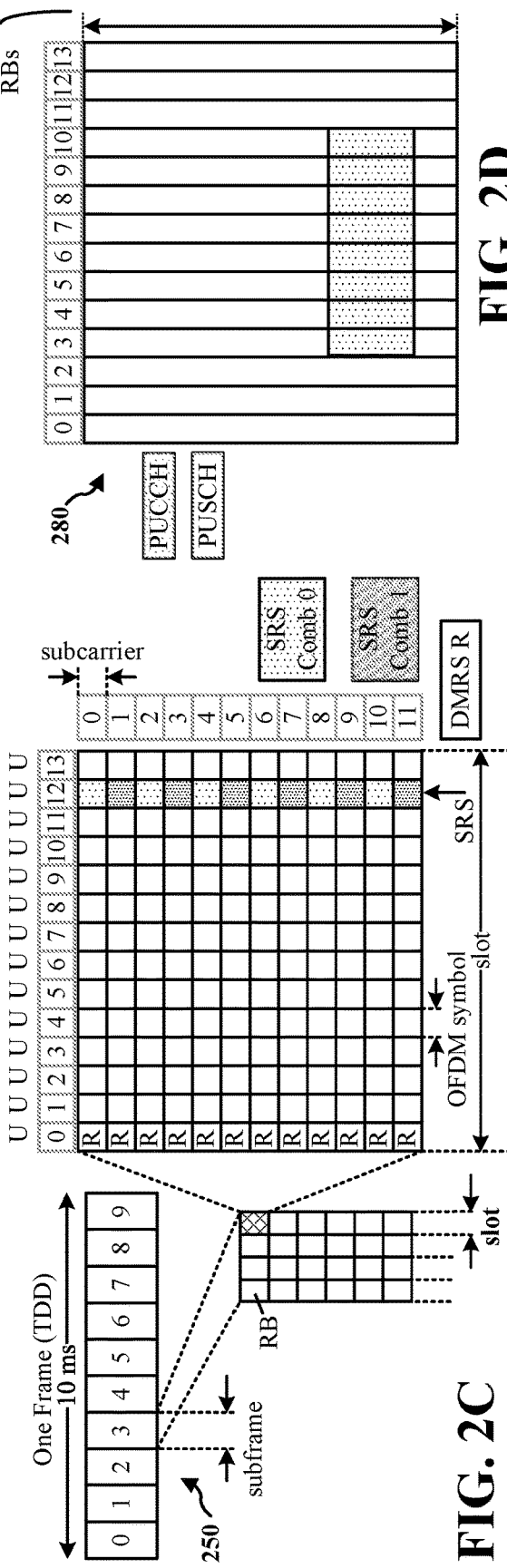
FIG. 2C
FIG. 2D

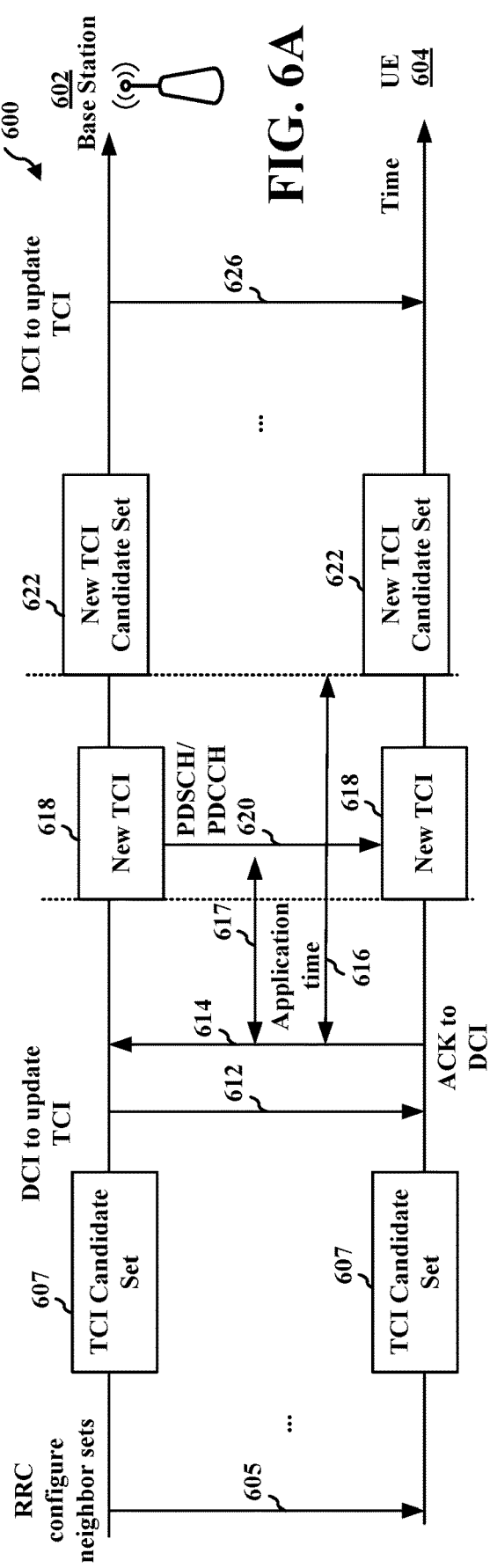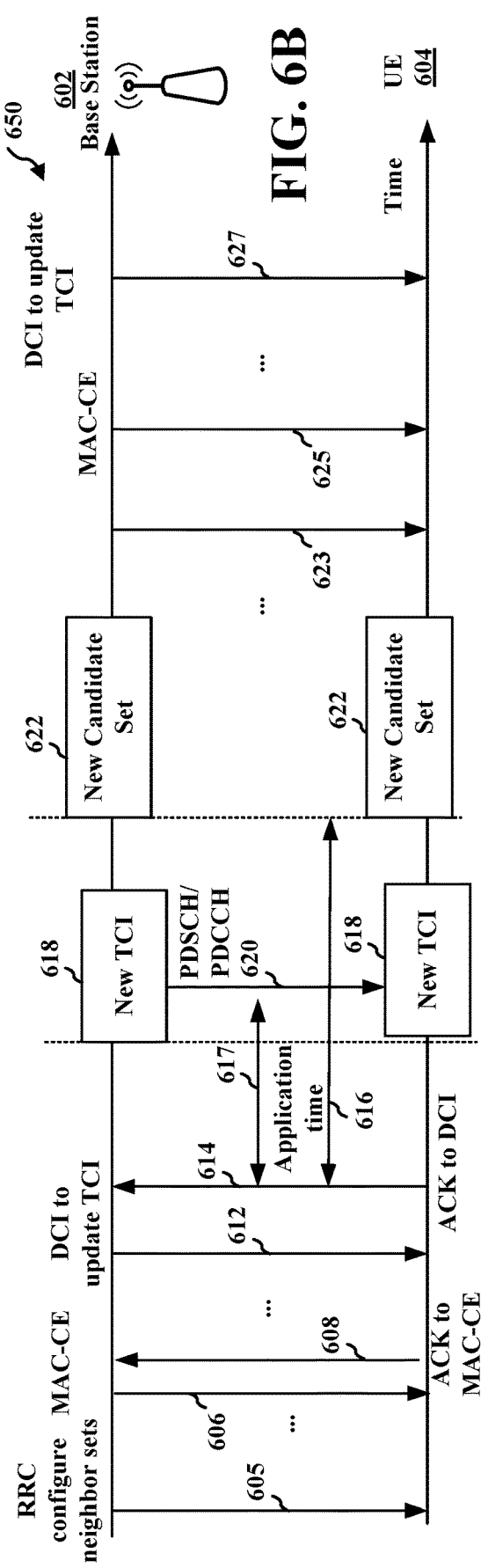

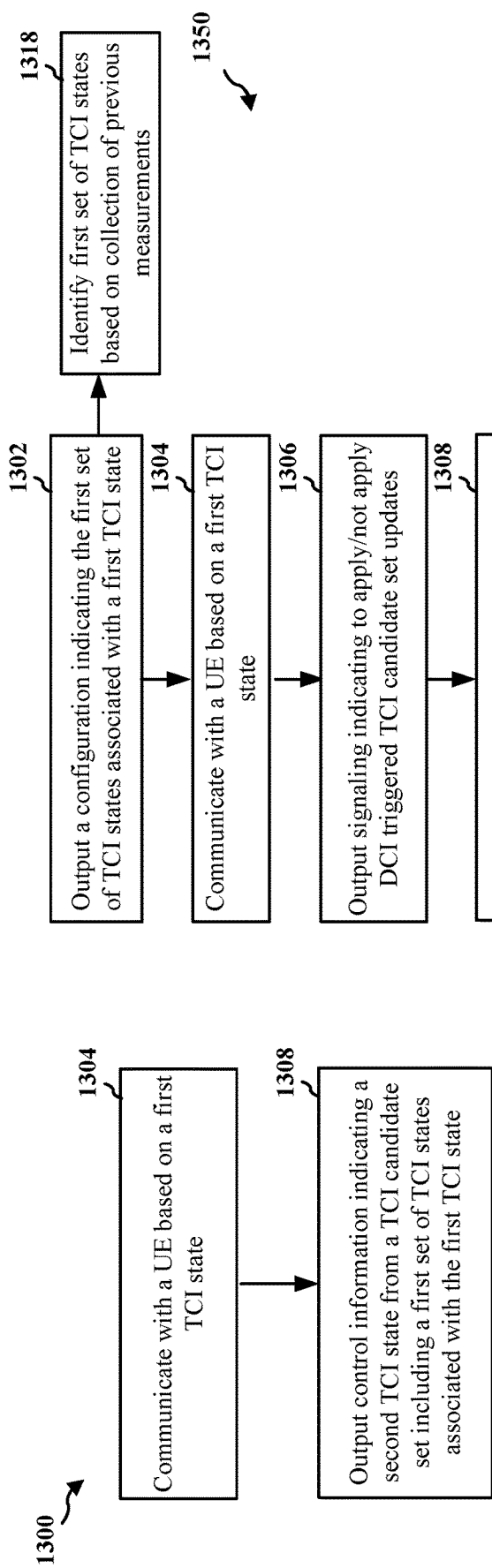
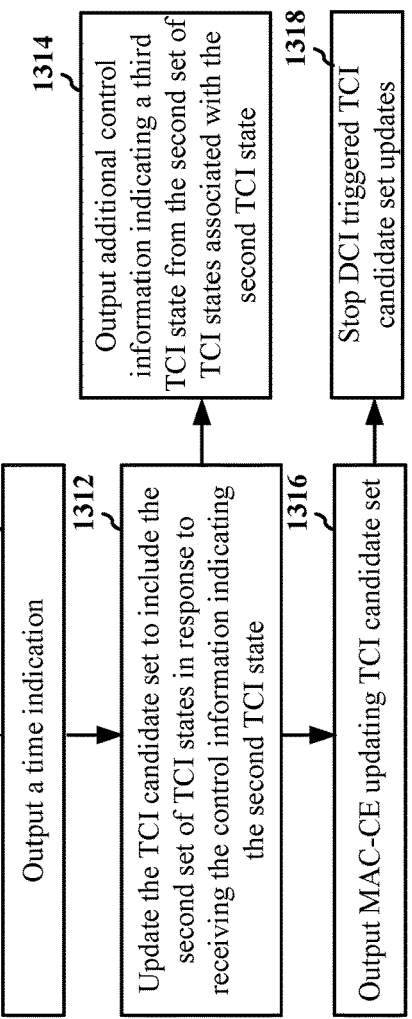
FIG. 13B
FIG. 13A

CANDIDATE BEAM SET UPDATE BASED ON DEFINED OR CONFIGURED NEIGHBORING BEAM SET

TECHNICAL FIELD

The present disclosure relates generally to communication systems, and more particularly, to wireless communication including beamformed communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus communicates with a network node based on a first transmission configuration indication (TCI) state. The apparatus receives control information indicating a second TCI state from a TCI candidate set that comprises a list of TCI states that can be activated for future communication, the TCI candidate set including a first set of TCI states associated with the first TCI state. The apparatus updates, in response to receiving the control information indicating the second TCI state, the TCI candidate set to include a second set of TCI states that have a second association with the second TCI state.

In an aspect of the disclosure, a method, a computer-readable medium, and an apparatus are provided for wireless communication at a network node. The apparatus communicates with a UE based on a first TCI state; and outputs control information indicating a second TCI state from a TCI candidate set including a first set of TCI states associated with the first TCI state.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 6A and FIG. 6B illustrate example timelines including TCI updates based on a configured or known relationship between TCI candidates, in accordance with various aspects of the present disclosure.

FIGS. 13A and 13B are flowcharts of methods of wireless communication, in accordance with various aspects of the present disclosure.

DETAILED DESCRIPTION

Figure 1:
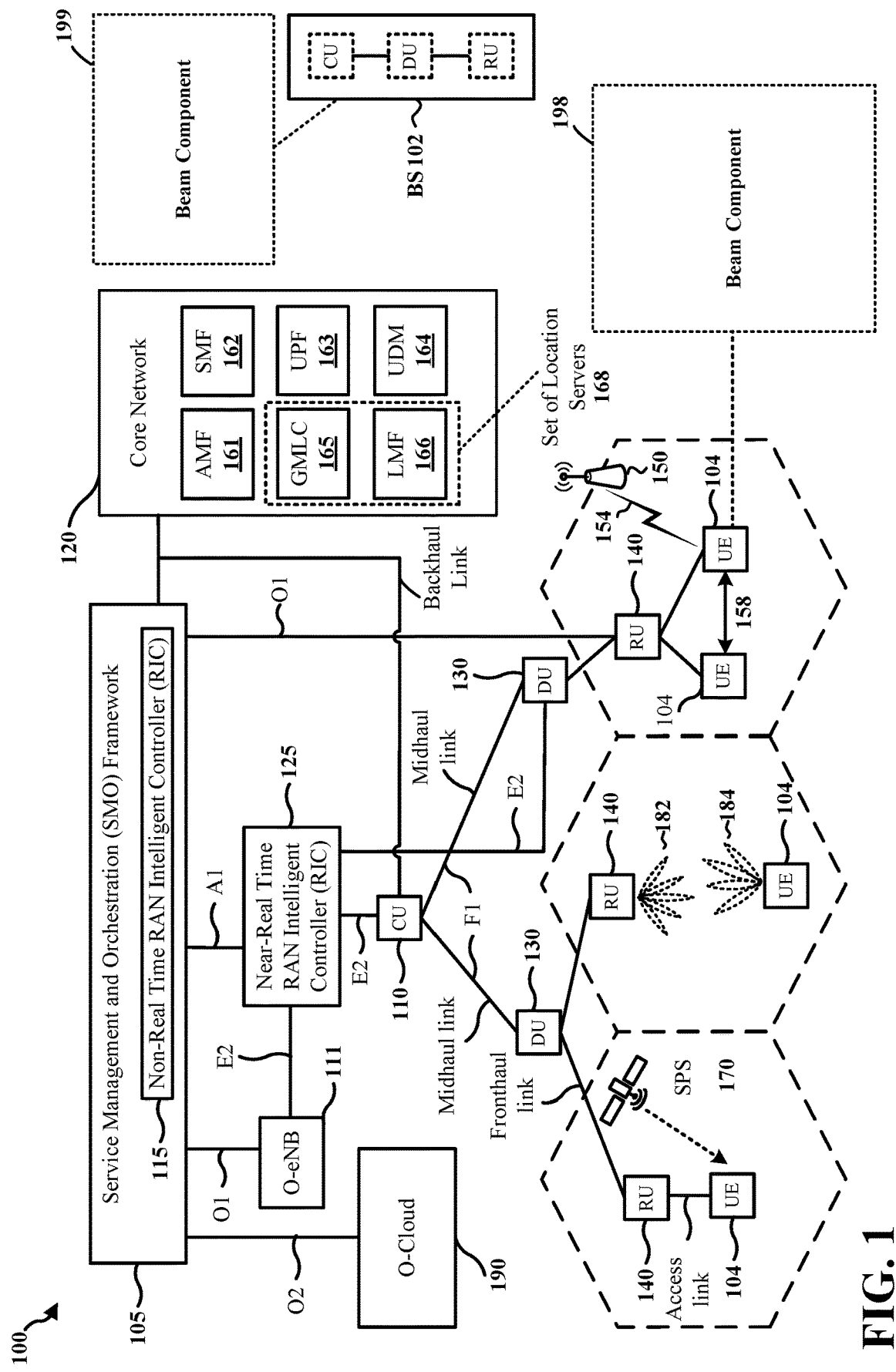
FIG. 1 is a diagram illustrating an example of a wireless communications system and an access network, in accordance with various aspects of the present disclosure.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (S Cell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam component 198 configured to communicate with a network node based on a first transmission configuration indication (TCI) state; receive control information indicating a second TCI state from a TCI candidate set that comprises a list of TCI states that can be activated for future communication, the TCI candidate set including a first set of TCI states associated with the first TCI state; and update, in response to receiving the control information indicating the second TCI state, the TCI candidate set to include a second set of TCI states that have a second association with the second TCI state. A base station, or a component of a base station 102 may include a beam component 199 configured to communicate with a UE based on a first TCI state and output control information indicating a second TCI state from a TCI candidate set including a first set of TCI states associated with the first TCI state.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
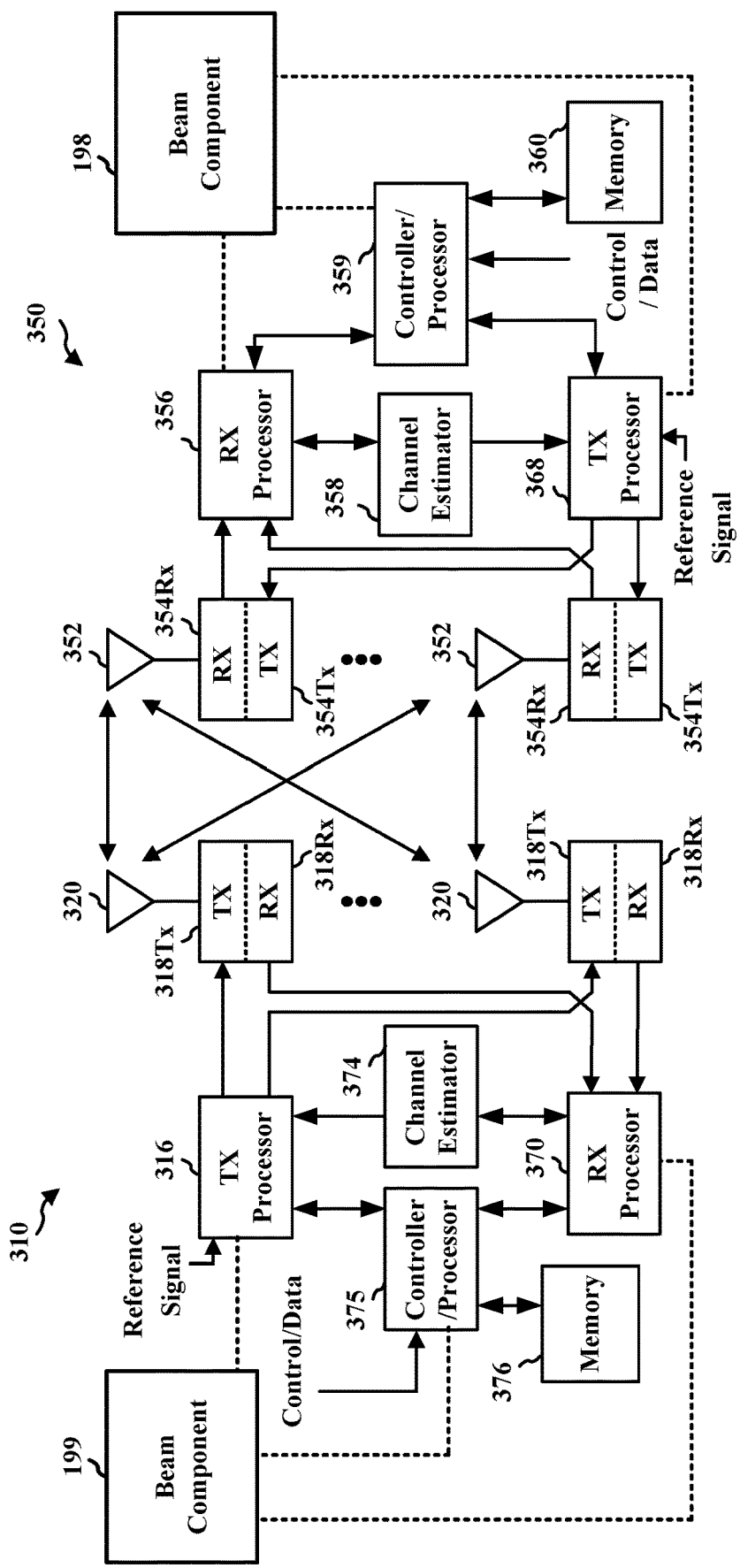
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam component 198 of FIG. 1.

At least one of the TX processor 316, the RX processor 370, and the controller/processor 375 may be configured to perform aspects in connection with the beam component 199 of FIG. 1.

Figure 4:
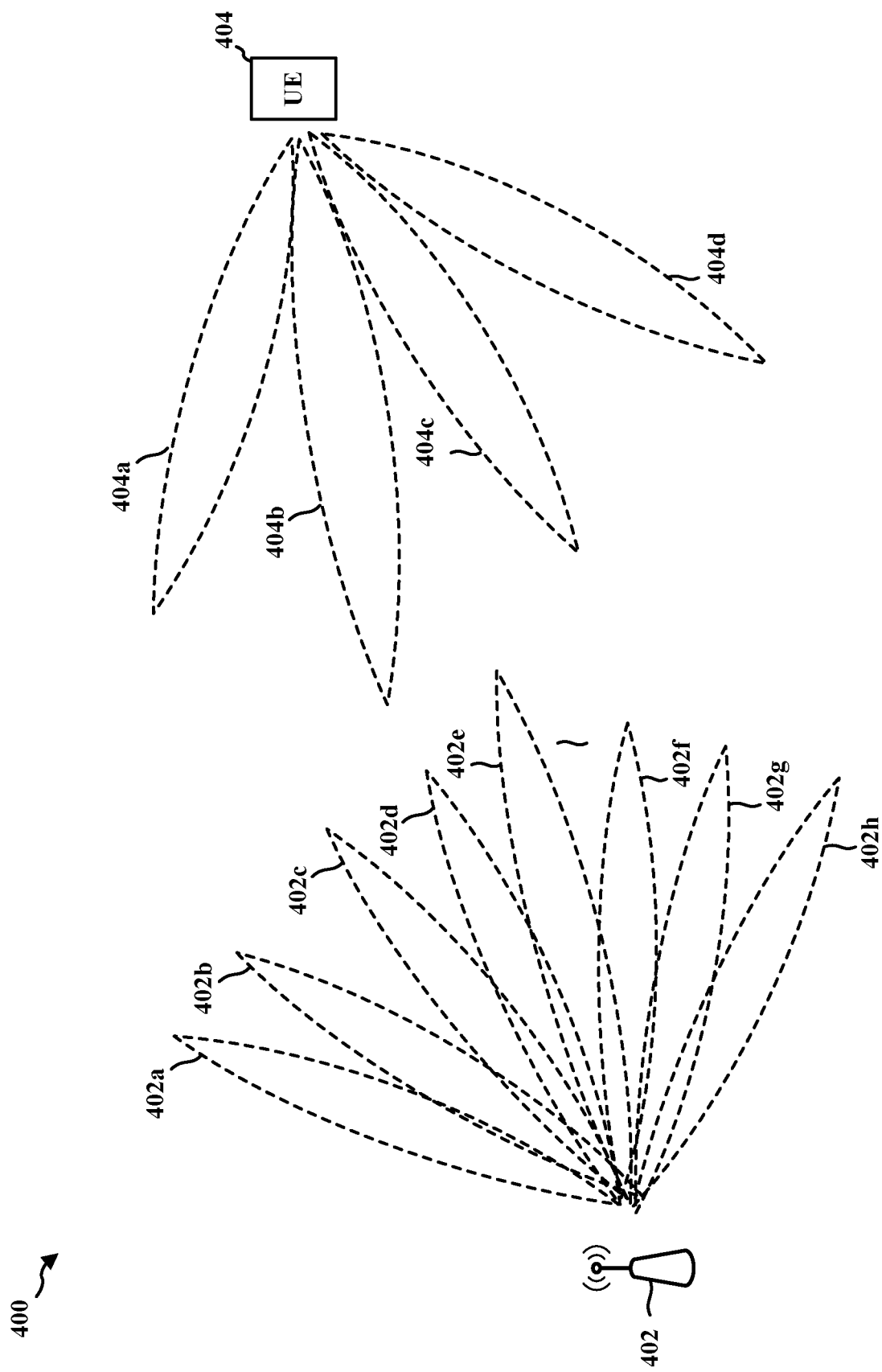
FIG. 4 illustrates an example of beamformed wireless communication between a base station and a UE, in accordance with various aspects of the present disclosure.

As illustrated in the diagram 400 in FIG. 4, the base station 402 and UE 404 may use beamformed communication to communicate over active data/control beams, e.g., directional beams, both for downlink communication and uplink communication. The base station and/or UE may perform beam management to perform measurements for various beams and to switch to an improved beam as conditions change. In some aspects, the UE and/or base station may switch to using a new beam direction based on beam failure recovery procedures. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402a-402h. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to switch to a corresponding beam. Switching beams may provide an improved connection between the UE and the base station by ensuring that the transmitter and receiver use the same configured set of beams for communication.

A TCI state may include quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RS s in one RS set and PDSCH/PDCCH DM-RS ports. TCI states can provide information about different beam selections for the UE to use for transmitting/receiving various signals. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

Beam management may be used for wireless mmW wireless communication. In a higher mmW frequency range, a larger antenna array size may be used, and the beam width and corresponding beam coverage area in a distant range (e.g., which may be referred to as a far field or distant field) may become smaller. In some aspects, the wireless communication may include MIMO, such as super-large MIMO. A near field range of super-large MIMO communication (e.g., super-large MIMO transmissions at a closer distance) that is transmitted with a large antenna array can be at a distance on the order of tens of meters from a base station transmitter array. The directivity gain of beamforming to the UE at a closer range, e.g., the near field range, may be sensitive not only to angle, but also to distance relative to the transmitter. There may be more frequent beam switches for UEs at closer distances to the base station. Beams within a closer distance of the transmitter, e.g., which may be referred to as a near field of array, may have an even smaller coverage area. It may be challenging to handle beam changes due to UE mobility, especially in higher frequency bands. Aspects presented herein provide improvements for beam management that reduce signaling overhead and reduce latency for a beam update. In some aspects, artificial intelligence (AI) or machine learning (ML) may be applied in connection with the beam management, beam selection, or beam switching.

Figure 5:
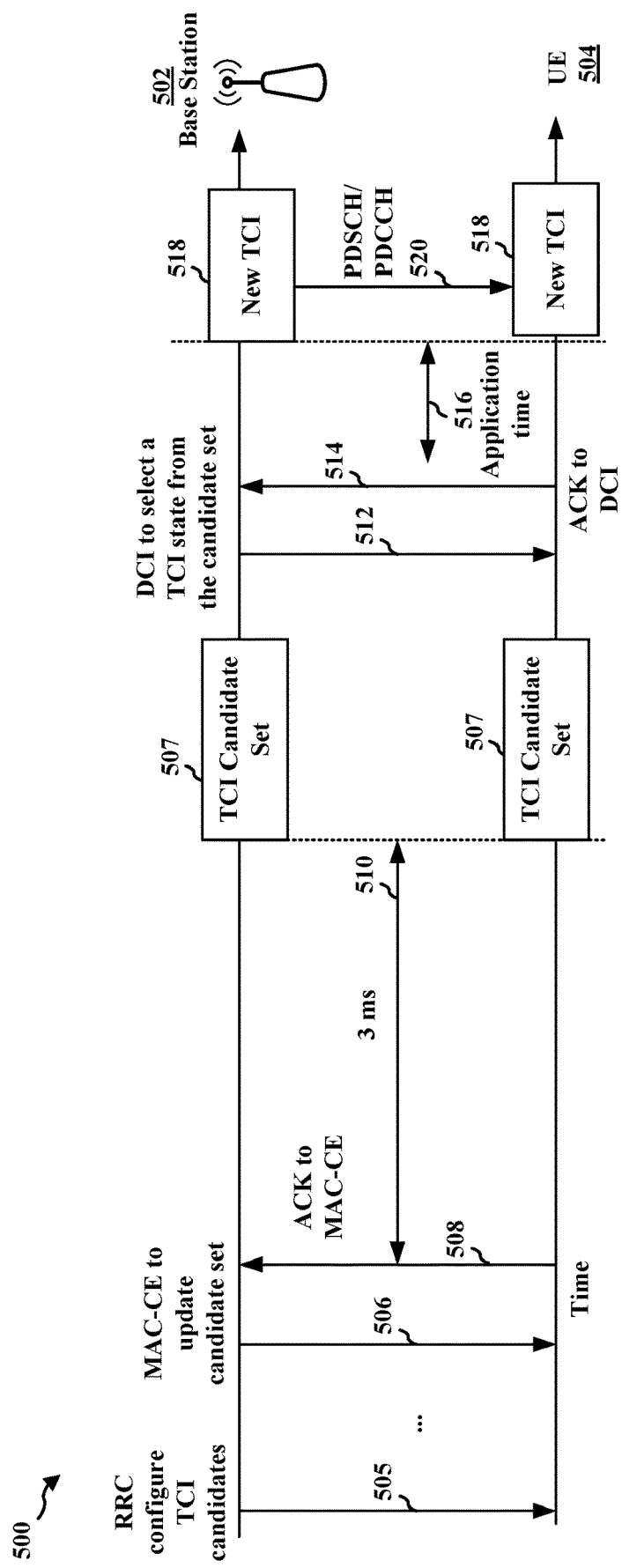
FIG. 5 illustrates an example timeline for updating a TCI state, in accordance with various aspects of the present disclosure.

FIG. 5 illustrates an example time diagram 500 showing a TCI update procedure between a base station 502 and a UE 504. As illustrated at 505, the base station 502 may configure TCI candidates for the UE 504. The configuration may be in RRC signaling, for example. Then, at 506, the base station 502 may indicate a candidate set of TCI states to the UE 504 from the RRC configured TCI candidates. The candidate set of TCI states may be referred to as a TCI candidate set, a candidate beam set, etc. As an example, the base station 502 may indicate the candidate set of TCI states in a MAC-CE transmission to the UE 504. The candidate set of TCI states may be a subset of the RRC configured TCI candidates. The base station may indicate a particular TCI state from the candidate set of TCI states, as a subset of candidate TCI states rather than from the full set of TCI states RRC configured for the UE. The UE 504 may transmit an acknowledgement (ACK) 508 of successful receipt of the MAC-CE to the base station 502 informing the base station that the UE is aware of the candidate set of TCI states. The base station may update or change the candidate set of TCI states by transmitting another MAC-CE to the UE 504. After the UE transmits the ACK 508 to the base station 502, there may be an activation time 510 provided before the updated candidate set of TCI states 507 indicated in the MAC-CE 506 becomes effective. For example, after the activation time 510 has passed following the ACK 508 to the MAC-CE update of the candidate set, at 506, the UE may interpret control signaling from the base station indicating a new TCI state based on the updated candidate set of TCI states 507. The activation time 510 may be on the order of 3 ms, which may enable an identification of miscommunication and reconfiguration or retransmission. For example, if the base station missed the ACK 508, the base station may transmit another indication of the updated candidate TCI set, and may successfully receive the ACK from the UE to the additional indication.

The base station 502 may then transmit downlink control information (DCI) 512 to the UE 504 selecting, or otherwise indicating, a TCI state from the current candidate set. As an example, the DCI may be DCI format 1_1 or DCI format 1_2. The UE transmits an ACK 514 to the DCI 512. The UE 504 and the base station 502 may apply the new TCI state 518 after a period of time 516, which may be referred to as an activation time. The period of time 516 for the application of the new TCI state may be much smaller than the 3 ms activation time 510. The UE may use the new TCI state 518 to receive PDSCH and/or PDCCH, e.g., 520, from the base station 502.

In some situations, such as wireless communication in higher mmW frequencies or in high mobility conditions such as on a high speed train, TCI updates may occur more frequently than in lower frequency communication or lower mobility conditions. Aspects presented herein improve beam management and help to reduce the latency for beam updates.

FIG. 6A illustrates an example time diagram 600 showing a mechanism for a UE 604 to update a TCI candidate set without an indication of an updated TCI candidate set from a base station 602, e.g., without the MAC-CE update at 506 in FIG. 5. The method in FIG. 6A reduces both latency and overhead for TCI candidate set updates. In FIG. 6A, the base station 602 configures TCI information for the UE 604. The TCI information may include candidate TCI states, such as described in connection with 505 in FIG. 5. Additionally, the base station 602 may configure an associated between the TCI candidates. As an example, for one or more of the TCI states, the base station 602 may indicate an association with other TCI states, e.g., which may be referred to as a set of neighbor TCI states, a set of related TCI states, a set of associated TCI states, etc. The network may use ML or AI based on a history of measurements from the UE and/or other UEs to identify the neighbor sets of TCI states, or associated sets of TCI states, to configure for the UE 604. In some aspects, the related TCI states or neighbor TCI states may be based on a trajectory of movement of the UE 604.

At 612, the base station 602 transmits DCI selecting, or otherwise indicating, a TCI state for the UE 604 from the current TCI candidate set 607, which may be a subset of the RRC configured TCI candidates as described in connection with FIG. 5. The UE transmits an ACK 614 for the DCI, and after the application time 617 elapses, the UE 604 and the base station 602 apply the new TCI state 618 for PDSCH and/or PDCCH 620.

The UE 604, and the base station 602, may then update the TCI candidate set to a new TCI candidate set 622. The new TCI candidate set 622 may be the neighboring set of TCI candidates, e.g., related or associated TCI candidates, that were indicated as being associated with the newly activated TCI state (e.g., 618) that was selected in the DCI 612. The UE 604 may use the relationships or association indicated in the RRC signaling, at 605, to update the TCI candidate set based on the newly indicated TCI state, e.g., 618. When a new TCI state is selected by the DCI 612, the neighboring TCI set for the new TCI state may be autonomously activated as candidate beam set, e.g., without specific signaling from the base station to the UE indicating the new candidate beam set. As illustrated at 622, the update may be applied at both the UE 604 and the base station 602 after a time period 616, which may be less than 3 ms. The reduced application time relative to the example in FIG. 5 may enable the UE and the base station to update the TCI candidate set more quickly and to reduce latency for beam changes. As well, without the MAC-CE to update the TCI candidate set, the overhead is reduced. Then, the DCI 626 may indicate or select a TCI state from the new TCI candidate set 622. In some aspects, the TCI candidate set may be further updated based on the TCI state selected in the DCI 626, as described for the DCI 612. The TCI candidate set may continue to be updated based on the selected TCI state.

The UE may be configured to track, observe, or perform measurements on the TCI states from the current TCI candidate set. For example, the base station 602 may assume that UE 604 will measure reference signals corresponding to each of the TCI stats in the current TCI candidate set, to maintain time and/or frequency synchronization with the base station 602 and/or to perform reception beam refinement for reception on the reference signals associated with the TCI states in the current TCI candidate set. The tracking or measurements may be helpful when the base station 602 later indicates for the UE 604 to switch to a TCI state from the candidate TCI set, because it may enable the UE to communicate via the new TCI state with a reduced or minimum delay, e.g., and without performing additional measurement which may cause an additional delay.

In some aspects, the previous candidate set of TCI states, e.g., from which the DCI 612 selects a TCI state may be activated by a separate MAC-CE. FIG. 6B illustrates an example timeline 650 similar to FIG. 6A in which the base station 602 may transmit a MAC-CE 606 indicating, or updating, a TCI candidate set. The UE may transmit an ACK 608, and following an activation time similar to 510, the DCI 612 may select a TCI state from the MAC-CE activated TCI candidate set. Additionally, or alternatively, a MAC-CE 625 may update the TCI candidate set after the new TCI candidate set 622 is applied. A DCI 627 may select a TCI state from the TCI candidate set activated by the MAC-CE 625, e.g., based on the timeline described in connection with FIG. 5.

In some aspects, some TCI updates by DCI may not trigger a candidate beam set update, e.g., a new TCI candidate set. Thus, in some aspects, not all TCI updates by DCI will trigger candidate beam set update. In some aspects, the update of the TCI candidate set by the DCI indication of a selected TCI state may be turned on and off. In some aspects, the autonomous update may be turned on and/or off by signaling from the base station, e.g. in RRC signaling, a MAC-CE, or DCI. FIG. 6B illustrates that the base station 602 may transmit an indication, at 623, to the UE 604 that indicates to turn off the update of TCI candidate sets based on a DCI indication of a TCI state. In some aspects, the MAC-CE, at 625, may indicate to the UE 604 to turn off the autonomous updates, e.g., without the indication at 623. In some aspects, the TCI indication DCI 612 may include information, such as one or more bit, that indicates whether the TCI update in the DCI 612 will trigger the candidate beam set update, e.g., at 622. In some aspects, the indication, at 623, may be in a DCI. In some aspects, the base station 602 may configure a flag bit, or other indication, in RRC signaling to indicate to the UE whether to turn on the updates of the TCI candidate set based on a DCI selection of a TCI state or whether to turn off the updates of the TCI candidate set based on the DCI selection of the TCI state. For example, the indication, at 623 may be in RRC signaling. In some aspects, the flag bit may be provided per TCI candidate that is configured in the RRC signaling. For example, Table 1 illustrates that six TCI candidates may be RRC configured for a UE, e.g., TCI 1, TCI 2, TCI 3, TCI 4, TCI 5, and TCI 6. The RRC configuration may also indicate, for each of the TCI candidates, whether the selection of that TCI candidate in DCI from the base station will trigger the autonomous update of the TCI candidate set, e.g., to a new TCI candidate set such as 622. Table 1 illustrates that the selection of TCI 1 and TCI 5 in DCI from the base station is indicated to trigger the UE to update the TCI candidate set based on selection of TCI 1 or TCI 5 in DCI from the base station, whereas TCI 2, TCI 3, TCI 4, and TCI 6 do not trigger the UE to update the TCI candidate set. The UE may continue to use the previous TCI candidate set until the UE receives additional signaling, such as a MAC-CE update of the TCI candidate set or the selection of TCI 1 or TCI 5 before updating the TCI candidate set.

TABLE 1

| TCI Candidate | Selection of the TCI candidate in DCI triggers update of the TCI candidate set |
|---|---|
| TCI 1 | yes |
| TCI 2 | no |
| TCI 3 | no |
| TCI 4 | no |
| TCI 5 | yes |
| TCI 6 | no |

In some aspects, the RRC configured indication, e.g., flag bit, can be updated by MAC-CE. As an example, the UE may receive a MAC-CE from the base station that indicates that TCI 4 should trigger an update of the TCI candidate set. In some aspects, the indication in RRC signaling may be based on whether or not a neighbor TCI set, or associated TCI set, is RRC configured for a particular TCI candidate. In such an example, TCI 1 and TCI 5 may have a set of associated TCI candidates RRC configured as a neighbor set for TCI 1 or TCI 5, and TCI 2, TCI 3, TCI 4 and TCI 6 may not have a neighbor set of TCI candidates RRC configured for the UE. In this example, if TCI 1 is selected in the DCI, e.g., DCI 612, then the UE may apply the RRC configured neighbor set of TCI candidates as the new TCI candidate set 622. If TCI 4 is selected in DCI, the UE may apply TCI 4 as the new TCI state for PDSCH and PDCCH, but may retain the prior TCI candidate set.

Figure 7:
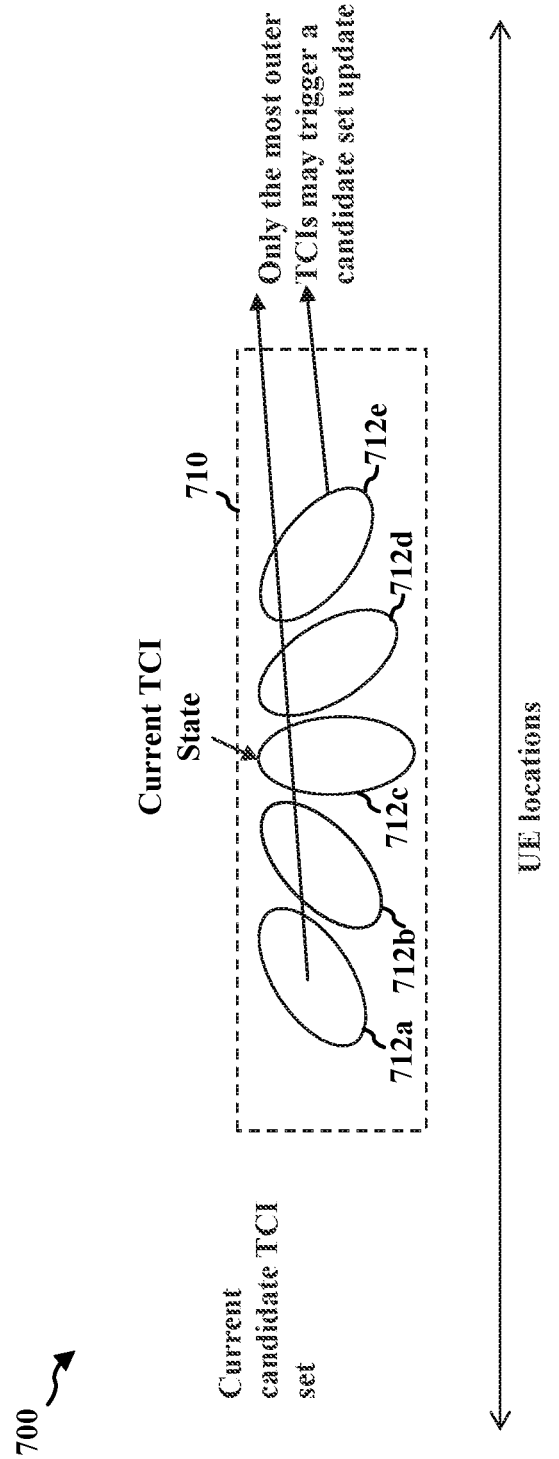
FIG. 7 illustrates an example TCI candidate set, in accordance with various aspects of the present disclosure.

In some aspects, a subset of TCI updates by DCI may trigger the TCI candidate set update. The subset of TCIs may be indicated in the RRC signaling, e.g., at 605. When the DCI, e.g., 612, indicates TCI updates to one of the TCIs in the subset configured to trigger the TCI candidate set update, the UE may apply the corresponding candidate beam set update based on the previously configured relationship, e.g., configured at 605. In some aspects, the subset of TCIs that trigger the update of the TCI candidate set may correspond to the boundary of the current coverage areas by the current candidate set. FIG. 7 illustrates a diagram 700 showing a current beam 712c for the current TCI state used for PDSCH and PDCCH between a UE and a base station, such as the UE 604 and the base station 602 in FIGS. 6A and 6B. FIG. 7 illustrates a current TCI candidate set 710 that includes beams 712a, 712b, 712c, 712d, and 712e that are each associated with a TCI states of the candidate set 710. In some aspects, DCI selection of the outer TCI states, e.g., associated with the beam 712a and 712e, and not the inner TCI states, e.g., 712b, 712c, 712d, of the candidate set 710 may trigger the UE update the TCI candidate set to a new TCI candidate set based on a set of neighbor TCI candidates to the selected TCI. For example, if the TCI state associated with the beam 712a is selected, the UE may update the candidate TCI set to a set of related or neighbor TCI candidates that were RRC configured for the TCI state associated with the beam 712a. If the TCI state associated with the beam 712b, 712c, or 712d is selected, the UE may continue to use the candidate TCI set 710.

In some aspects, the base station may further indicate a time stamp, or a time period, for the autonomous update of the TCI candidate set to be in effect for the UE, e.g., to be applied by the UE. In some aspects, the indicated time stamp, or time period, may be at least later than the normal application time, e.g., 616, following the ACK 614 to the DCI 612. If the time period is indicted to the UE, the UE may defer the new TCI candidate set, e.g., 622, until the time indicated to the UE. In some aspects, the neighboring beams associated with the new TCI candidate set may not be relevant for the UE until the indicated time stamp, so that UE does not need to track or monitor the new candidate beams until the indicated time. The delay in time, or the more specific time for application, may help the UE to save power from waiting to perform monitoring of reference signals on the new TCI candidate set.

In some aspects, there may be a fall-back scheme, e.g., that allows the UE to transition to MAC-CE based signaling of TCI candidate set updates at times. As an example, the actual TCI state for the UE to use in a TCI candidate set may be outside of the RRC configured neighbor set. In some aspects, and error or a low probability case may occur in which a particular TCI candidate beam is overloaded and another TCI candidate would be better. In some aspects, a base station may identify a miscommunication between the UE and the base station. For example, a UE may miss a beam update DCI, the UE may misinterpret a beam update DCI, or the network may miss an ACK from the UE. The UE and the base station may lose synchronization between TCI candidate set updates, such that UE and the base station may update the candidate beam in an un-synchronized manner. As an example, if the UE missed the DCI, or the base station missed the previous ACK from the UE and later indicates another TCI state in DCI, the candidate beam set used at UE may be different than the candidate beam set used at the base station. In some aspects, even when the autonomous update mode (e.g., the update of the TCI candidate set by DCI selection of a TCI state) or the UE is triggered to update the TCI candidate set based on the DCI selection of a TCI state, the base station may send MAC-CE signaling to update the TC candidate set. If the UE receives a MAC-CE indication to update a TCI candidate set, the MAC-CE indication may override the TCI candidate set that was updated based on a DCI selection of a TCI state. For example, FIG. 6B illustrates that in response to the MAC-CE 625 with a TCI candidate set update, the UE 604 may apply the TCI candidate set from the MAC-CE 625 instead of continuing to apply the candidate set 622. In some aspects, the receipt of the MAC-CE 625 with a TCI candidate set update may indicate for the UE 604 to turn off, or stop, the update of the TCI candidate set based on DCI selection of a TCI state. As an example, the UE may continue to apply the TCI candidate set from the MAC-CE 625 even after the DCI 627 selects a new TCI state.

Figure 8:
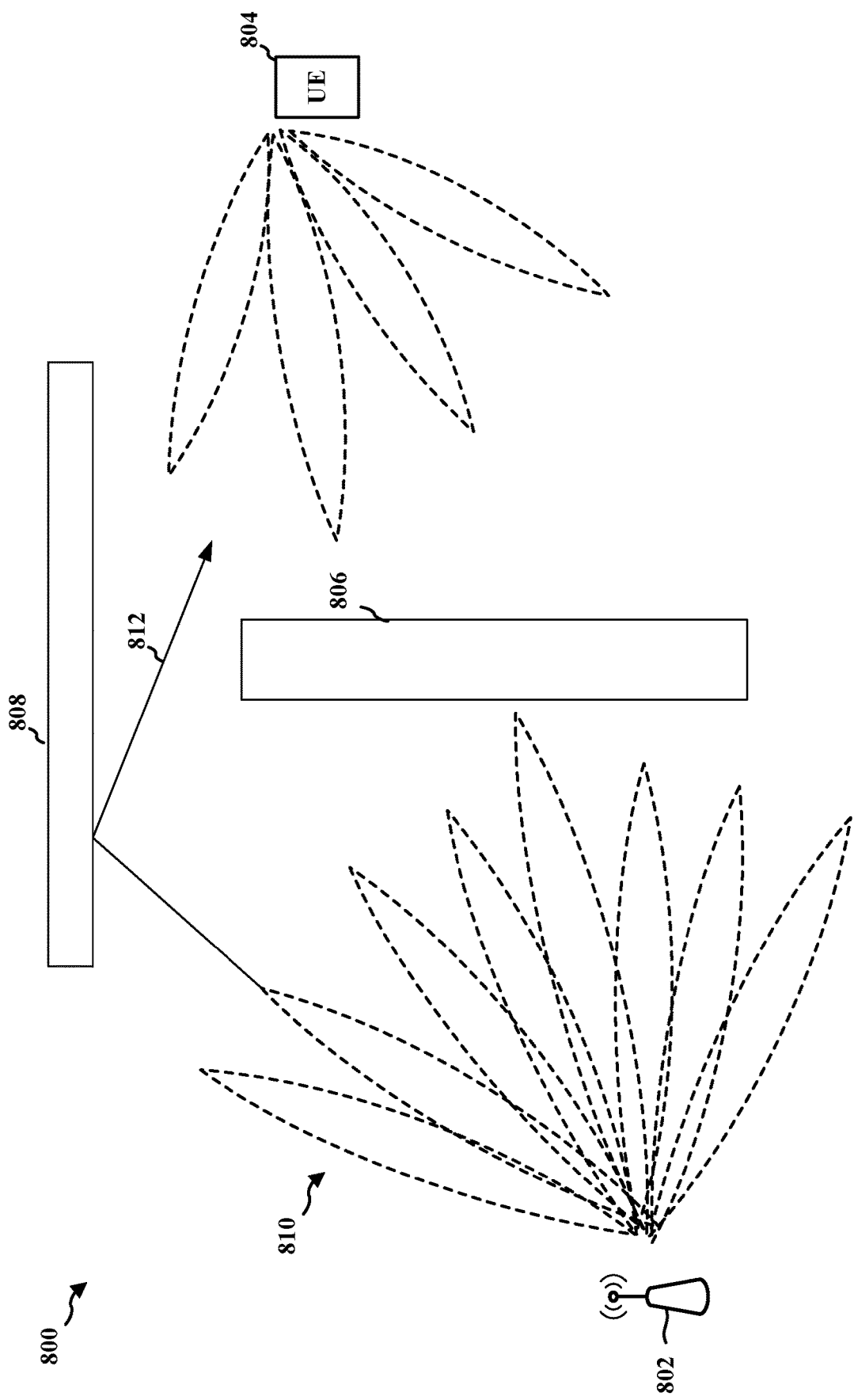
FIG. 8 illustrates a non-line of sight condition between a UE and a base station, in accordance with various aspects of the present disclosure.

In some situations, a UE may be in a line of sight (LOS) condition with the base station, such as illustrated in FIG. 4, in which the UE receives a beamformed transmission directly from the base station. In other examples, a UE may be in a non-line of sight (NLOS) condition with the base station. FIG. 8 illustrates an example diagram 800 in which the beams from the base station 802 may be blocked by a blockage 806 in the environment between the UE 804 and the base station 802 or may be reflected by a physical item 808 in the environment. In cells with a LOS condition between the UE and the base station, the neighboring beams in an angle of arrival (AoA)/angle of departure (AoD) domain of the base station beamforming pattern, e.g., 810 may cover adjacent areas in the cells. The base station may know the neighboring beam set from a pattern of its beamforming codebook. In many environments, there may be NLOS factors, such as reflections 812 or blockages, as shown at 806. The neighboring beams in AoD/AoA based on the beamforming pattern 810 of the base station may not cover adjacent areas. In order for the base station to determine more likely subsequent TCIs given a current TCI state of a UE, the UE may collect RSRP measurements of different beams and/or from different UEs. The base station may include a machine learning module that may be trained to identify the distribution of subsequent TCI candidates based on a collected database. The base station may then configure the relationship between the identified neighboring TCI states and the particular TCI state, e.g., in the RRC configuration at 605.

Figure 9:
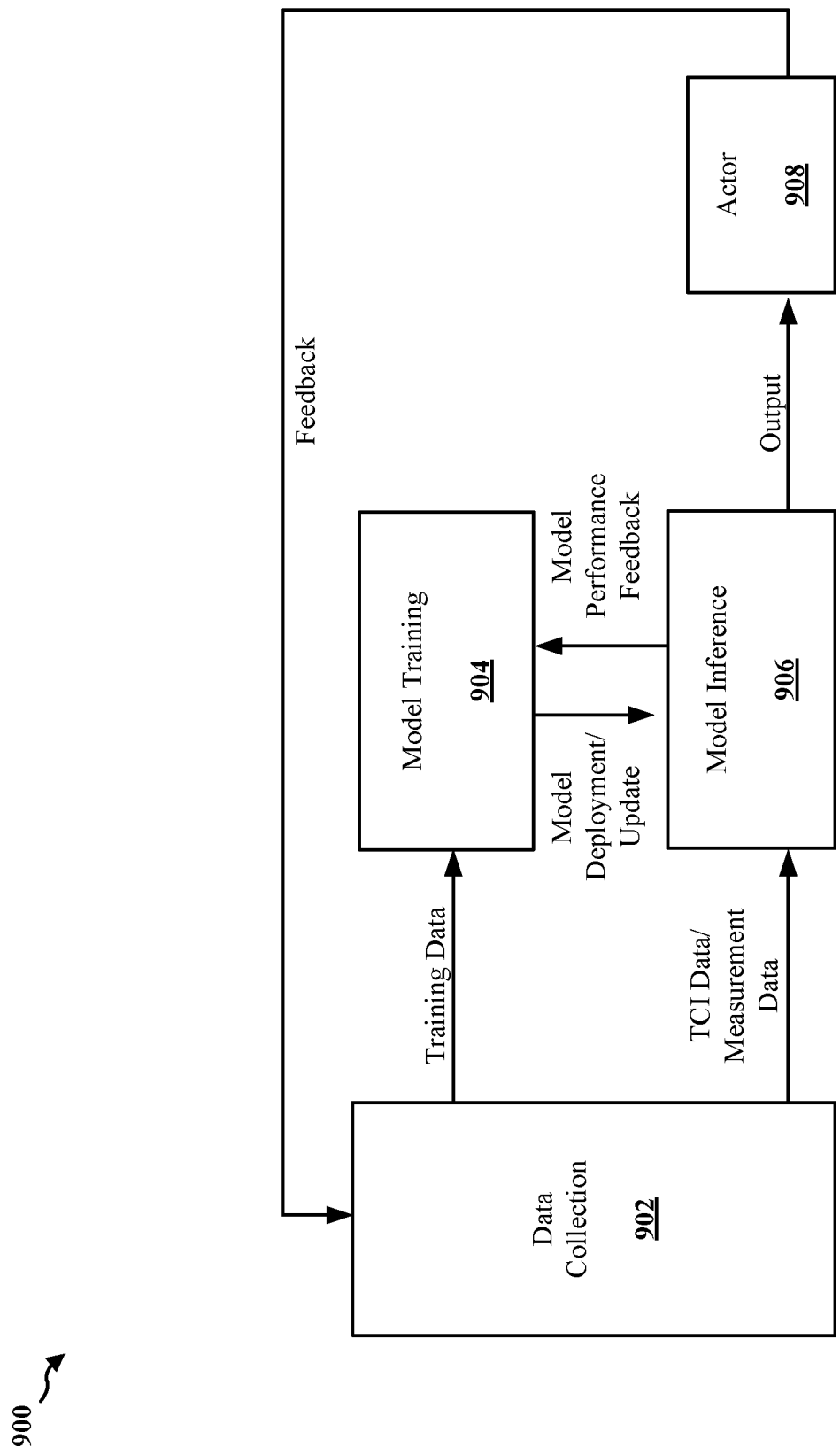
FIG. 9 illustrates example aspects in connection with machine learning, in accordance with various aspects of the present disclosure.

FIG. 9 is an example of the AI/ML algorithm 900 of a method of wireless communication. The AI/ML algorithm 900 may include various functions including a data collection 902, a model training function 904, a model inference function 906, and an actor 908.

The data collection 902 may be a function that provides input data to the model training function 904 and the model inference function 906. The data collection 902 function may include any form of data preparation, and it may not be specific to the implementation of the AI/ML algorithm (e.g., data pre-processing and cleaning, formatting, and transformation). The examples of input data may include, but not limited to, measurements, such as RSRP measurements or other TCI candidate information, from network entities including UEs or network nodes, feedback from the actor 908, output from another AI/ML model. The data collection 902 may include training data, which refers to the data to be sent as the input for the AI/ML model training function 904, and inference data, which refers to be sent as the input for the AI/ML model inference function 906.

The model training function 904 may be a function that performs the ML model training, validation, and testing, which may generate model performance metrics as part of the model testing procedure. The model training function 904 may also be responsible for data preparation (e.g. data pre-processing and cleaning, formatting, and transformation) based on the training data delivered or received from the data collection 902 function. The model training function 904 may deploy or update a trained, validated, and tested AI/ML model to the model inference function 906, and receive a model performance feedback from the model inference function 906.

The model inference function 906 may be a function that provides the AI/ML model inference output (e.g. predictions or decisions). The model inference function 906 may also perform data preparation (e.g. data pre-processing and cleaning, formatting, and transformation) based on the inference data delivered from the data collection 902 function. The output of the model inference function 906 may include the inference output of the AI/ML model produced by the model inference function 906. The details of the inference output may be use-case specific. As an example, the output may include a set of neighbor TCI candidate that have a relationship to one or more TCI states. The base station may then configure the neighbor TCI candidates to be a TCI candidate set triggered upon selection of the related TCI state. In some aspects, the actor may be an RRC configuration component of the base station or may be the UE that receives the RRC configuration.

The model performance feedback may refer to information derived from the model inference function 906 that may be suitable for improvement of the AI/ML model trained in the model training function 904. The feedback from the actor 908 or other network entities (via the data collection 902 function) may be implemented for the model inference function 906 to create the model performance feedback.

The actor 908 may be a function that receives the output from the model inference function 906 and triggers or performs corresponding actions. The actor may trigger actions directed to network entities including the other network entities or itself. The actor 908 may also provide a feedback information that the model training function 904 or the model interference function 906 to derive training or inference data or performance feedback. The feedback may be transmitted back to the data collection 902.

The network may use machine-learning algorithms, deep-learning algorithms, neural networks, reinforcement learning, regression, boosting, or advanced signal processing methods for aspects of wireless communication including the identification of neighbor TCI candidates for autonomous TCI candidate set updates based on DCI selection of a TCI state.

In some aspects described herein, the network may train one or more neural networks to learn dependence of measured qualities on individual parameters. Among others, examples of machine learning models or neural networks that may be comprised in the network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data.

For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

Once the network has identified the relationship between TCI states, e.g., neighbor TCI candidates, the base station may configure the UE with the neighboring sets, e.g., in the RRC configuration 605. In some aspects, the RRC configuration 605 may include a list of neighbor (or related or associated) TCI candidates that is configured per TCI candidate. As an example, a TCI information element (IE) in the RRC configuration may include an indication that for TCI candidate TCI 0, the neighbor TCI states includes TCI 1 and TCI 2, e.g., TCI0->{TCI1, TCI2}. Then, if the TCI 0 is selected in DCI signaling, e.g., 612, the UE updates the TCI candidate set to include TCI 0, TCI 1, and TCI 2.

In some aspects, the indication of the neighbor TCI candidates may be based on an adjacent placement in a matrix, and the matrix may be a separate RRC IE from any of the TCI IEs in the RRC configuration. For example, the base station may configure 64 TCI candidates, and may separately provide an adjacent matrix that is a bit matrix of size 64-by-64 (or 64-by-63 since a TCI is a neighbor of itself by default). A bit in the m-th row, n-th column of the matrix may indicate whether m-th TCI candidate is in the neighboring of n-th TCI candidate.

Figure 10:
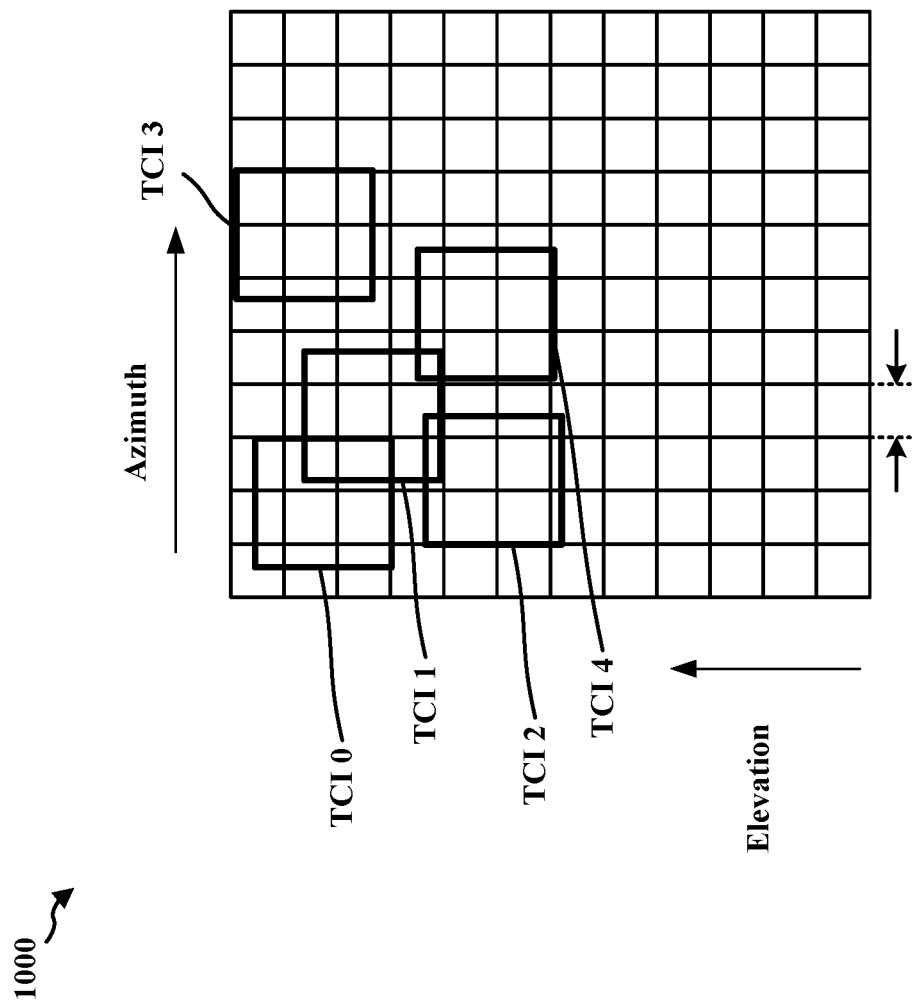
FIG. 10 illustrates a relationship between TCI candidates based on a set of resources in elevation and azimuth, in accordance with various aspects of the present disclosure.

In some aspects, the base station may configure the neighbor TCI candidates based on an angular domain. The angular domain configuration may be helpful in LOS conditions. The base station may identify a set of resources based on elevation and azimuth, e.g., based on an AoD/ZoD domain at the base station. FIG. 10 illustrates an example of a set of resources 1000 based on elevation and azimuth. Each TCI candidate is associated with one or more boxes based on the spatial domain direction and beam width. FIG. 10 illustrates a set of resources associated with TCI 0, TCI 1, TCI 2, TCI 3, and TCI 4. Any TCI states, e.g., TCI candidates, sharing overlapping areas of resources can be identified as being part of a neighboring TCI candidate set. As an example, for TCI 2, the neighboring TCI candidates include TCI 0, TCI 1, and TCI 4 based on overlap with TCI 2, but does not include TCI 3. The base station may configure, for the UE, the map of boxes and the association between the TCI candidates and boxes of resources.

In some aspects, the neighbor set of TCI candidates may be based on a rule or algorithm. In some aspects, the UE may use the rule or algorithm to identify neighboring set based on TCI IDs. For example, the UE may receive a configuration of the rule or the algorithm to use to determine the neighbor candidate sets for a particular TCI. In such an example, the base station might not signal the individual sets to the UE, and the UE may instead apply the rule to a TCI state to obtain the corresponding set of associated TCI candidates. In some aspects, the rule or algorithm may be defined, and the UE may know the rule/algorithm.

As an example of a rule, the neighboring candidate set for a particular, activated TCI state may include N TCI states whose TCI state ID is closest to that of the activated TCI state. In some aspects, this rule may be applied in LOS or linear trajectory conditions. An example of a linear trajectory condition is a UE on a high speed train.

As another example of a rule, the UE may map a TCI state ID of a current, activated TCI state to a virtual space (e.g. 2D space of AoA/AoD, such as described in connection with FIG. 10), and the UE may determine the neighboring candidate set for a particular, activated TCI state based on proximity in the virtual space.

As another example, an algorithm or a table may be configured at UE to enable the UE to identify the next candidate beam set when the base station activates a particular TCI state in DCI. In some aspects, the input to the algorithm may be the ID of the activated TCI state, and the output may be a probability of each candidate beam (and corresponding candidate TCI state) to the ID of the activated TCI state. The UE may then select the top N beams having a highest output probability.

Figure 11B:
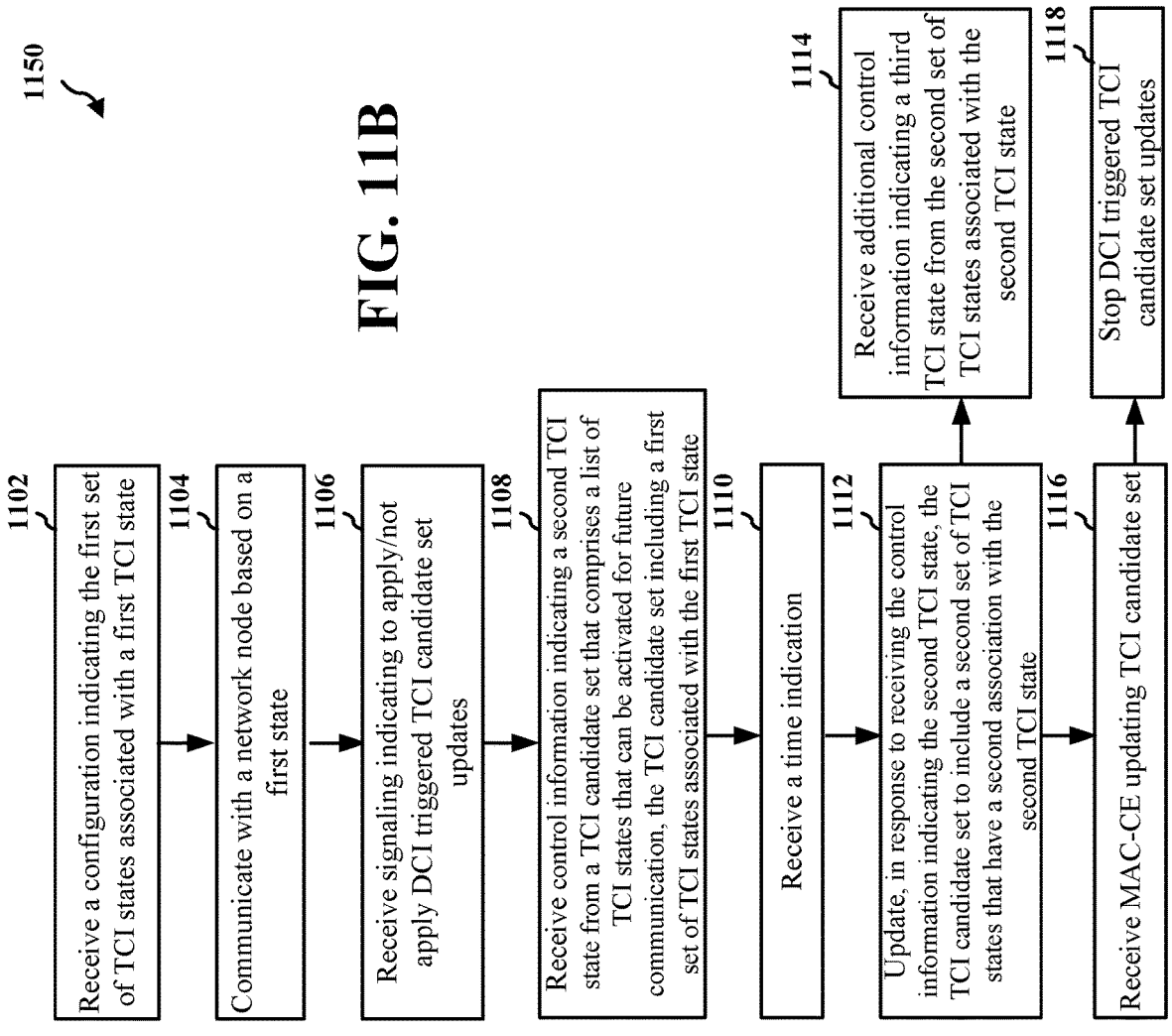
FIGS. 11A and 11B are flowcharts of methods of wireless communication, in accordance with various aspects of the present disclosure.
Figure 11A:
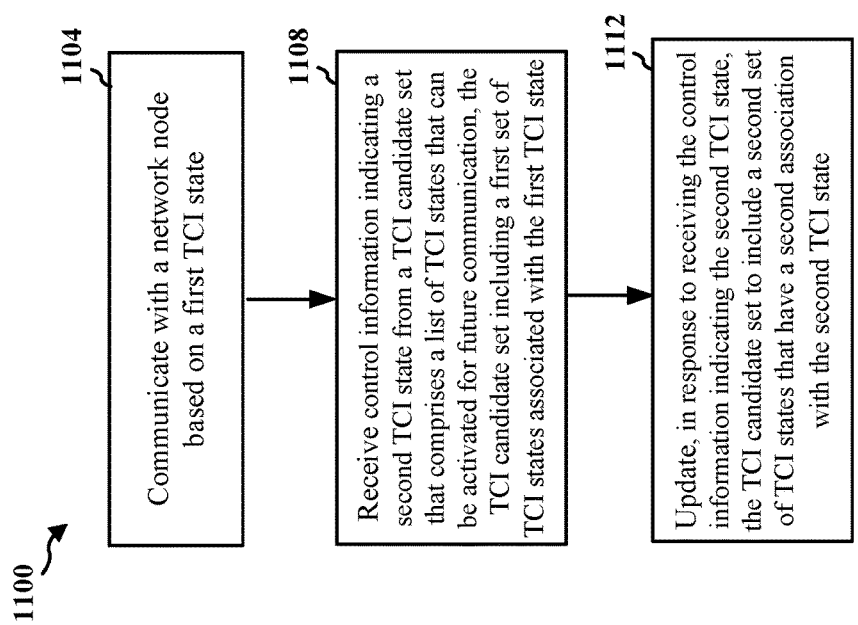

FIG. 11A is a flowchart 1100 of a method of wireless communication. The method may be performed by a UE (e.g., the UE 104, 350, 404, 504, 604; the apparatus 1204). The method may enable the UE to reduce latency for beam updates and may help to reduce overhead for beam management.

At 1104, the UE communicates with a network node based on a first TCI state. For example, the UE may receive PDSCH and/or PDCCH from the network node based on the first TCI state. The communication may be performed, e.g., by the beam component 198, e.g., as a part of the UE 104 or 350 or of the apparatus 1204.

At 1108, the UE receives control information indicating a second TCI state from a TCI candidate set that comprises a list of TCI states that can be activated for future communication, the TCI candidate set including a first set of TCI states associated with the first TCI state. As an example, the UE may receive a DCI indicating, or selecting, a new TCI state, such as described in connection with 612 in FIGS. 6A and 6B. In some aspects, the control information may be included in a MAC-CE. The reception may be performed, e.g., by the beam component 198, e.g., as a part of the UE 104 or 350 or of the apparatus 1204.

At 1112, the UE may update, in response to receiving the control information indicating the second TCI state, the TCI candidate set to include a second set of TCI states that have a second association with the second TCI state. For example, as illustrated in FIGS. 6A and 6B, the UE may apply a new TCI candidate set 622 in response to receiving the DCI 612 identifying a new TCI state. The update may be performed, e.g., by the beam component 198, e.g., as a part of the UE 104 or 350 or of the apparatus 1204. In some aspects, at 1112, the UE may update the TCI candidate set to include a second set of TCI states in response to receiving the control information indicating the second TCI state, the second set of TCI states being based on the second TCI state and at least one of a rule, an algorithm, or a table.

FIG. 11B is a flowchart 1150 of a method of wireless communication. The method may be performed by a UE (e.g., the UE 104, 350, 404, 504, 604; the apparatus 1204). The method may enable the UE to reduce latency for beam updates and may help to reduce overhead for beam management.

At 1104, the UE communicates with a network node based on a first TCI state. For example, the UE may receive PDSCH and/or PDCCH from the network node based on the first TCI state. The communication may be performed, e.g., by the beam component 198, e.g., as a part of the UE 104 or 350 or of the apparatus 1204.

At 1108, the UE receives control information indicating a second TCI state from a TCI candidate set that comprises a list of TCI states that can be activated for future communication, the TCI candidate set including a first set of TCI states associated with the first TCI state. As an example, the UE may receive a DCI indicating, or selecting, a new TCI state, such as described in connection with 612 in FIGS. 6A and 6B. In some aspects, the control information may be included in a MAC-CE. The reception may be performed, e.g., by the beam component 198, e.g., as a part of the UE 104 or 350 or of the apparatus 1204.

At 1112, the UE may update, in response to receiving the control information indicating the second TCI state, the TCI candidate set to include a second set of TCI states that have a second association with the second TCI state. For example, as illustrated in FIGS. 6A and 6B, the UE may apply a new TCI candidate set 622 in response to receiving the DCI 612 identifying a new TCI state. The update may be performed, e.g., by the beam component 198, e.g., as a part of the UE 104 or 350 or of the apparatus 1204. In some aspects, at 1112, the UE may update the TCI candidate set to include a second set of TCI states in response to receiving the control information indicating the second TCI state, the second set of TCI states being based on the second TCI state and at least one of a rule, an algorithm, or a table.

As illustrated at 1102, the UE may receive, prior to the control information at 1108, a configuration indicating the first set of TCI states associated with a first TCI state. For example, the configuration may be received in an RRC configuration, e.g., such as described in connection with 605 in FIGS. 6A and/or 6B. The reception may be performed, e.g., by the beam component 198, e.g., as a part of the UE 104 or 350 or of the apparatus 1204. The configuration may include a list of each TCI state associated with the first TCI state. The configuration may include a matrix indicating associated TCI states for each of multiple TCI states. A set of resources may be based on an azimuth and elevation relative to the network node, and the first TCI candidate set may include each TCI state having a subset of the resources that overlaps with the first TCI state.

The network may indicate the association between the TCI states in any of various ways, e.g., as a list, an adjacent matrix, a set of overlapping resources based on azimuth and elevation, a table, an algorithm, a rule etc. In some aspects, the association may be referred to as a neighbor set or a related set. The UE may receive an indication of associated TCI states for one or more TCI states configured as a candidate in RRC signaling, and may not receive an indication of associated TCI states for one or more other TCI states configured as a candidate in the RRC signaling, e.g., so that the UE is configured with neighbor TCI candidate sets for a subset of the TCI candidates configured for the UE.

In some aspects, the configuration may include a second set of TCI states associated with the second TCI state.

As illustrated at 1114, the UE may receive additional control information indicating a third TCI state from the second set of TCI states associated with the second TCI state. For example, as described in connection with FIG. 6B, the DCI 627 may indicate a TCI state from the new candidate set 622. The reception may be performed, e.g., by the beam component 198, e.g., as a part of the UE 104 or 350 or of the apparatus 1204.

As illustrated at 1106, prior to the control information, the UE may receive signaling indicating for the UE to apply DCI triggered TCI candidate set updates, wherein the TCI candidate set is updated to the second set of TCI states associated with the second TCI state based on the signaling, wherein the signaling is comprises in at least one of RRC signaling or a MAC-CE. The reception may be performed, e.g., by the beam component 198, e.g., as a part of the UE 104 or 350 or of the apparatus 1204. The signaling may indicate a subset of TCI states for which the UE is to apply the DCI triggered TCI candidate set updates.

As illustrated at 1110, the UE may receive a time indication that indicates a time period for the UE to apply a DCI triggered TCI candidate set update, wherein the TCI candidate set is updated to the second set of TCI states associated with the second TCI state after the time period indicated to the UE. The reception may be performed, e.g., by the beam component 198, e.g., as a part of the UE 104 or 350 or of the apparatus 1204. For example, the time period 616 may be based on a received time indication, e.g., as described in connection with FIGS. 6A and 6B. The time period may be longer than an application time for a DCI triggered TCI candidate set update without the time indication.

In some aspects, at 1116 the UE may receive a MAC-CE updating the TCI candidate set. The reception may be performed, e.g., by the beam component 198, e.g., as a part of the UE 104 or 350 or of the apparatus 1204. FIG. 6B illustrates that the UE may receive the MAC-CE 625 updating the TCI candidate set. As illustrated at 1118, the UE may stop DCI triggered TCI candidate set updates in response to receiving the MAC-CE updating the TCI candidate set. The stopping may be performed, e.g., by the beam component 198, e.g., as a part of the UE 104 or 350 or of the apparatus 1204.

As illustrated at 1106, in some aspects, the UE may receive, prior to the control information at 1114, signaling indicating for the UE to not apply DCI triggered TCI candidate set updates, wherein the UE does not update the TCI candidate set based on an activation of the third TCI state. The reception may be performed, e.g., by the beam component 198, e.g., as a part of the UE 104 or 350 or of the apparatus 1204.

Figure 12:
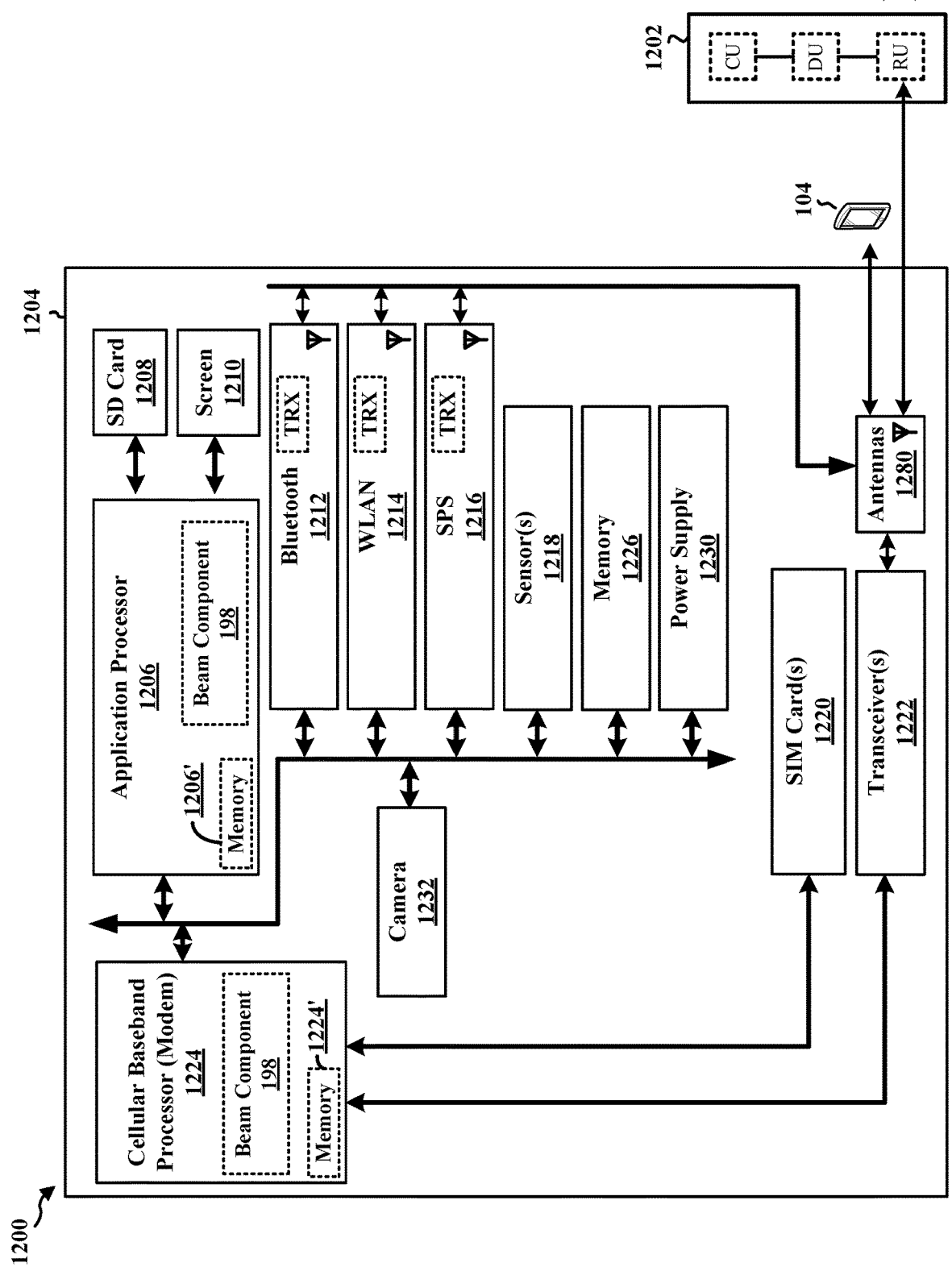
FIG. 12 is a diagram illustrating an example of a hardware implementation for an example apparatus and/or a UE, in accordance with various aspects of the present disclosure.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the beam component 198 is configured to receive PDSCH and/or PDCCH from the network node based on the first TCI state, and receive control information indicating a second TCI state from a TCI candidate set including a first set of TCI states associated with the first TCI state. The apparatus 1204 may be further configured to receive a configuration indicating the first set of TCI states associated with the second TCI state; receive signaling indicating for the UE to apply DCI triggered TCI candidate set updates, wherein the TCI candidate set is updated to the second set of TCI states associated with the second TCI state based on the signaling; receive a time indication that indicates a time period for the UE to apply a DCI triggered TCI candidate set update; receive a MAC-CE updating the TCI candidate set, receive the MAC-CE updating the TCI candidate set; and/or receive, prior to the control information at, signaling indicating for the UE to not apply DCI triggered TCI candidate set updates. The beam component 198 and/or another component of the apparatus 1204 may be configured to perform any of the aspects described in connection with FIG. 11A, 11B, and/or the aspects performed by the UE in FIG. 6A or 6B. The beam component 198 may be within the cellular baseband processor 1224, the application processor 1206, or both the cellular baseband processor 1224 and the application processor 1206. The beam component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving PDSCH and/or PDCCH from the network node based on the first TCI state, and means for receiving control information indicating a second TCI state from a TCI candidate set including a first set of TCI states associated with the first TCI state. The apparatus 1204 may further include means for receiving a configuration indicating the first set of TCI states associated with a first TCI state; means for updating the TCI candidate set to include the second set of TCI states in response to receiving the control information indicating the second TCI state; means for receiving additional control information indicating a third TCI state from the second set of TCI states associated with the second TCI state; means for receiving signaling indicating for the UE to apply DCI triggered TCI candidate set updates, wherein the TCI candidate set is updated to the second set of TCI states associated with the second TCI state based on the signaling; means for receiving a time indication that indicates a time period for the UE to apply a DCI triggered TCI candidate set update; means for receiving a MAC-CE updating the TCI candidate set, receive the MAC-CE; means for updating the TCI candidate set; and/or means for receiving, prior to the control information at, signaling indicating for the UE to not apply DCI triggered TCI candidate set updates. The means may be the beam component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 13A is a flowchart 1300 of a method of wireless communication. The method may be performed by a network node (e.g., the base station or a component of the base station 102, 310, 402, 502, 602, 802; the CU 110; the DU 130; the RU 140; the network entity 1402). The method may help to reduce latency for beam updates between a UE and a base station and may help to reduce overhead for beam management.

At 1304, the network node communicates with a network node based on a first TCI state. For example, the network node may transmit PDSCH and/or PDCCH from the network node based on the first TCI state. The communication may be performed, e.g., by the beam component 199, e.g., as a part of the base station 102, 310, or of the network entity 1402.

At 1308, the network node outputs control information indicating a second TCI state from a TCI candidate set including a first set of TCI states associated with the first TCI state. As an example, the network node may output a DCI indicating, or selecting, a new TCI state, such as described in connection with 612 in FIGS. 6A and 6B. In some aspects, the control information may be included in a MAC-CE. The output may be performed, e.g., by the beam component 199, e.g., as a part of the base station 102, 310, or of the network entity 1402.

FIG. 13B is a flowchart 1350 of a method of wireless communication. The method may be performed by a network node (e.g., the base station or a component of the base station 102, 310, 402, 502, 602, 802; the CU 110; the DU 130; the RU 140; the network entity 1402). The method may help to reduce latency for beam updates between a UE and a base station and may help to reduce overhead for beam management.

At 1304, the network node communicates with a network node based on a first TCI state. For example, the network node may transmit PDSCH and/or PDCCH from the network node based on the first TCI state. The communication may be performed, e.g., by the beam component 199, e.g., as a part of the base station 102, 310, or of the network entity 1402.

At 1308, the network node outputs control information indicating a second TCI state from a TCI candidate set including a first set of TCI states associated with the first TCI state. As an example, the network node may output a DCI indicating, or selecting, a new TCI state, such as described in connection with 612 in FIGS. 6A and 6B. In some aspects, the control information may be included in a MAC-CE. The output may be performed, e.g., by the beam component 199, e.g., as a part of the base station 102, 310, or of the network entity 1402.

As illustrated at 1302, the network node may output, prior to the control information at 1308, a configuration indicating the first set of TCI states associated with a first TCI state. For example, the configuration may be output in an RRC configuration, e.g., such as described in connection with 605 in FIGS. 6A and/or 6B. The output may be performed, e.g., by the beam component 199, e.g., as a part of the base station 102, 310, or of the network entity 1402. The configuration may include a list of each TCI state associated with the first TCI state. The configuration may include a matrix indicating associated TCI states for each of multiple TCI states. A set of resources may be based on an azimuth and elevation relative to the network node, and the first TCI candidate set may include each TCI state having a subset of the resources that overlaps with the first TCI state.

The network may indicate the association between the TCI states in any of various ways, e.g., as a list, an adjacent matrix, a set of overlapping resources based on azimuth and elevation, a table, an algorithm, a rule etc. In some aspects, the association may be referred to as a neighbor set or a related set. The network node may output an indication of associated TCI states for one or more TCI states configured as a candidate in RRC signaling, and may not output an indication of associated TCI states for one or more other TCI states configured as a candidate in the RRC signaling, e.g., so that the network node configures the UE with neighbor TCI candidate sets for a subset of the TCI candidates configured for the UE.

In some aspects, the configuration may include a second set of TCI states associated with the second TCI state, and at 1312, the network node may update the TCI candidate set to include the second set of TCI states in response to outputting the control information indicating the second TCI state. For example, as illustrated in FIGS. 6A and 6B, the network node may apply a new TCI candidate set 622 in response to outputting the DCI 612 identifying a new TCI state. The update may be performed, e.g., by the beam component 199, e.g., as a part of the base station 102, 310, or of the network entity 1402. In some aspects, at 1312, the network node may update the TCI candidate set to include a second set of TCI states in response to outputting the control information indicating the second TCI state, the second set of TCI states being based on the second TCI state and at least one of a rule, an algorithm, or a table.

In some aspects, at 1318, the network node may identify the first set of TCI states associated with the first TCI state based on a collection of previous measurements of potential TCI states from one or more UEs. The network node may identify the first set of TCI states based on machine learning or artificial intelligence. Various aspects of identifying neighboring TCI candidates based on machine learning are described in connection with FIG. 9.

As illustrated at 1314, the network node may output additional control information indicating a third TCI state from the second set of TCI states associated with the second TCI state. For example, as described in connection with FIG. 6B, the DCI 627 may indicate a TCI state from the new candidate set 622. The output may be performed, e.g., by the beam component 199, e.g., as a part of the base station 102, 310, or of the network entity 1402.

As illustrated at 1306, prior to the control information, the network node may output signaling indicating for the UE to apply DCI triggered TCI candidate set updates, wherein the TCI candidate set is updated to the second set of TCI states associated with the second TCI state based on the signaling, wherein the signaling is comprises in at least one of RRC signaling or a MAC-CE. The reception may be performed, e.g., by the beam component 199, e.g., as a part of the base station 102, 310, or of the network entity 1402. The signaling may indicate a subset of TCI states for which the UE is to apply the DCI triggered TCI candidate set updates.

As illustrated at 1310, the network node may output a time indication that indicates a time period for the UE to apply a DCI triggered TCI candidate set update, wherein the TCI candidate set is updated to the second set of TCI states associated with the second TCI state after the time period indicated to the UE. The output may be performed, e.g., by the beam component 199, e.g., as a part of the base station 102, 310, or of the network entity 1402. For example, the time period 616 may be based on a received time indication, e.g., as described in connection with FIGS. 6A and 6B. The time period may be longer than an application time for a DCI triggered TCI candidate set update without the time indication.

In some aspects, at 1316 the network node may output a MAC-CE updating the TCI candidate set. The output may be performed, e.g., by the beam component 199, e.g., as a part of the base station 102, 310, or of the network entity 1402. FIG. 6B illustrates that the network node may output the MAC-CE 625 updating the TCI candidate set. As illustrated at 1318, the network node, and UE, may stop DCI triggered TCI candidate set updates in response to receiving the MAC-CE updating the TCI candidate set. The stopping may be performed, e.g., by the beam component 199, e.g., as a part of the base station 102, 310, or of the network entity 1402.

As illustrated at 1306, in some aspects, the network node may output, prior to the control information at 1308, signaling indicating for the UE to not apply DCI triggered TCI candidate set updates, wherein the UE does not update the TCI candidate set based on an activation of the second TCI state. The output may be performed, e.g., by the beam component 199, e.g., as a part of the base station 102, 310, or of the network entity 1402.

Figure 14:
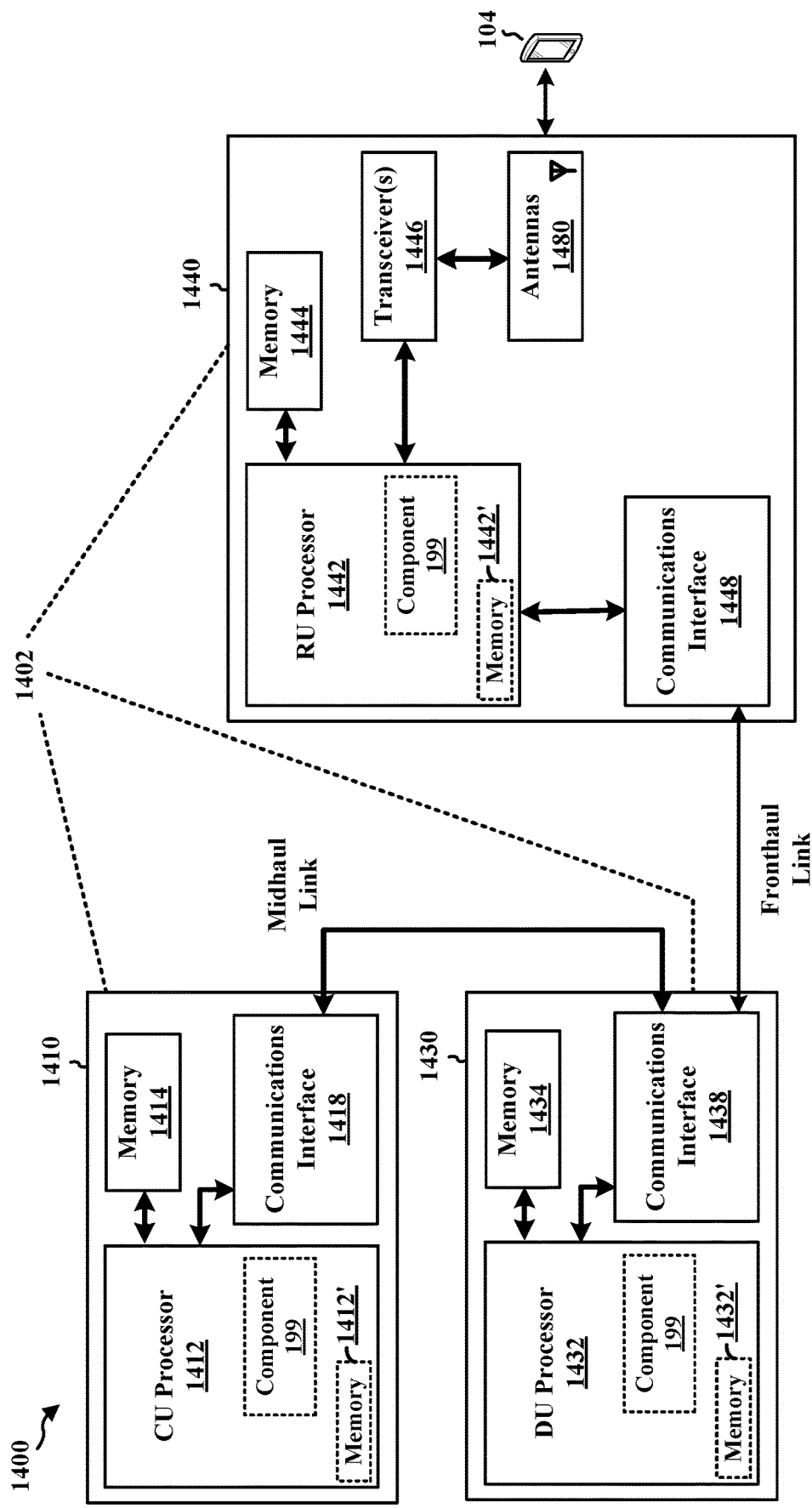
FIG. 14 is a diagram illustrating an example of a hardware implementation for an example network entity, in accordance with various aspects of the present disclosure.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the beam component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the beam component 199 is configured to communicate with a UE based on a first TCI state; and output control information indicating a second TCI state from a TCI candidate set including a first set of TCI states associated with the first TCI state. The beam component 199 may be further configured to output, prior to the control information, a configuration indicating the first set of TCI states associated with a first TCI state; update the TCI candidate set to include the second set of TCI states in response to outputting the control information indicating the second TCI state; output additional control information indicating a third TCI state from the second set of TCI states associated with the second TCI state; output, prior to the control information, signaling indicating for the UE to apply DCI triggered TCI candidate set updates, wherein the TCI candidate set is updated to the second set of TCI states associated with the second TCI state based on the signaling; output a time indication that indicates a time period for the UE to apply a DCI triggered TCI candidate set update, wherein the TCI candidate set is updated to the second set of TCI states associated with the second TCI state after the time period indicated to the UE; output a MAC-CE updating the TCI candidate set, output, prior to the control information, signaling indicating for the UE to not apply DCI triggered TCI candidate set updates; identify the first set of TCI states associated with the first TCI state based on a collection of previous measurements of potential TCI states from one or more UEs; and/or update the TCI candidate set to include a second set of TCI states in response to outputting the control information indicating the second TCI state, the second set of TCI states being based on the second TCI state and at least one of a rule, an algorithm, or a table. The beam component 199 may be within one or more processors of one or more of the CU 1410, DU 1430, and the RU 1440. The beam component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means wherein the time period is longer than an application time for a DCI triggered TCI candidate set update without the time indication, means for outputting a MAC-CE updating the TCI candidate set, means for outputting, prior to the control information, signaling indicating for the UE to not apply DCI triggered TCI candidate set updates, means for identifying the first set of TCI states associated with the first TCI state based on a collection of previous measurements of potential TCI states from one or more UEs, and/or means for updating the TCI candidate set to include a second set of TCI states in response to outputting the control information indicating the second TCI state, the second set of TCI states being based on the second TCI state and at least one of a rule, an algorithm, or a table. The means may be the beam component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: communicating with a network node based on a first TCI state; receiving control information indicating a second TCI state from a TCI candidate set that comprises a list of TCI states that can be activated for future communication, the TCI candidate set including a first set of TCI states associated with the first TCI state; and updating, in response to receiving the control information indicating the second TCI state, the TCI candidate set to include a second set of TCI states that have a second association with the second TCI state.

In aspect 2, the method of aspect 1 further includes receiving, prior to the control information, a configuration indicating the first association between the first set of TCI states and the first TCI state.

In aspect 3, the method of aspect 2 further includes that the configuration further indicates the second association between the second set of TCI states and the second TCI state.

In aspect 4, the method of aspect 3 further includes receiving additional control information indicating a third TCI state from the second set of TCI states associated with the second TCI state.

In aspect 5, the method of aspect 3 or aspect 4 further includes receiving, prior to the control information, signaling indicating for the UE to apply DCI triggered TCI candidate set updates, wherein the TCI candidate set is updated to the second set of TCI states associated with the second TCI state based on the signaling, wherein the signaling is comprises in at least one of RRC signaling or a MAC-CE.

In aspect 6, the method of aspect 5 further includes that the signaling indicates a subset of TCI states for which the UE is to apply the DCI triggered TCI candidate set updates.

In aspect 7, the method of any of aspect 1 to 6 further includes receiving a time indication that indicates a time period for the UE to apply a DCI triggered TCI candidate set update, wherein the TCI candidate set is updated to the second set of TCI states associated with the second TCI state after the time period indicated to the UE.

In aspect 8, the method of aspect 7 further includes that the time period is longer than an application time for a DCI triggered TCI candidate set update without the time indication.

In aspect 9, the method of any of aspects 1 to 8 further includes receiving a MAC-CE updating the TCI candidate set.

In aspect 10, the method of aspect 9 further includes stopping DCI triggered TCI candidate set updates in response to receiving the MAC-CE updating the TCI candidate set.

In aspect 11, the method of aspect 1, 2 or 7-10 further includes receiving signaling indicating for the UE to not apply downlink control information (DCI) triggered TCI candidate set updates; and receiving additional control information indicating a third TCI state from the second set of TCI states associated with the second TCI state wherein the UE does not update the TCI candidate set based on an activation of the third TCI state.

In aspect 12, the method of any of aspects 1-11 further includes that the configuration includes a list of each TCI state associated with the first TCI state.

In aspect 13, the method of any of aspects 1-11 further includes that the configuration includes a matrix indicating associated TCI states for each of multiple TCI states.

In aspect 14, the method of any of aspects 1-11 further includes that a set of resources are based on an azimuth and elevation relative to the network node, and the first TCI candidate set includes each TCI state having a subset of the resources that overlaps with the first TCI state.

In aspect 15, the method of any of aspects 1-14 further includes that the second set of TCI states are identified based on the second TCI state and at least one of a rule, an algorithm, or a table.

Aspect 16 is an apparatus for wireless communication at a UE, comprising means to perform the method of any of aspects 1 to 15.

Aspect 17 in an apparatus for wireless communication at a UE, comprising memory and at least one processor coupled to the memory and configured to perform the method of any of aspects 1 to 15.

In aspect 18, the apparatus of aspect 16 or 17 further includes at least one of a transceiver or an antenna coupled to the at least one processor.

Aspect 19 is a non-transitory computer-readable medium storing computer executable code at a UE, the code when executed by a processor causes the processor to perform the method of any of aspects 1 to 15.

Aspect 20 is a method of wireless communication at network node, comprising: communicating with a UE based on a first TCI state; and outputting control information indicating a second TCI state from a TCI candidate set including a first set of TCI states associated with the first TCI state.

In aspect 21, the method of aspect 20 further includes outputting, prior to the control information, a configuration indicating the first set of TCI states associated with a first TCI state.

In aspect 22, the method of aspect 20 or 21 further includes that the configuration further includes a second set of TCI states associated with the second TCI state, the method further comprising: updating the TCI candidate set to include the second set of TCI states in response to outputting the control information indicating the second TCI state.

In aspect 23, the method of any of aspects 20-22 further includes outputting additional control information indicating a third TCI state from the second set of TCI states associated with the second TCI state.

In aspect 24, the method of any of aspects 20-23 further includes outputting, prior to the control information, signaling indicating for the UE to apply DCI triggered TCI candidate set updates, wherein the TCI candidate set is updated to the second set of TCI states associated with the second TCI state based on the signaling, wherein the signaling is comprises in at least one of RRC signaling or a MAC-CE.

In aspect 25, the method of aspect 24 further includes that the signaling indicates a subset of TCI states for which the UE is to apply the DCI triggered TCI candidate set updates.

In aspect 26, the method of any of aspects 20-25 further includes outputting a time indication that indicates a time period for the UE to apply a DCI triggered TCI candidate set update, wherein the TCI candidate set is updated to the second set of TCI states associated with the second TCI state after the time period indicated to the UE, wherein the time period is longer than an application time for a DCI triggered TCI candidate set update without the time indication.

In aspect 27, the method of any of aspects 20-26 further includes outputting a MAC-CE updating the TCI candidate set.

In aspect 28, the method of aspect 20 or 21 further includes outputting, prior to the control information, signaling indicating for the UE to not apply DCI triggered TCI candidate set updates.

In aspect 29, the method of any of aspects 20-28 further includes that the configuration includes a list of each TCI state associated with the first TCI state.

In aspect 30, the method of any of aspects 20-28 further includes that the configuration includes a matrix indicating associated TCI states for each of multiple TCI states.

In aspect 31, the method of any of aspects 20-28 further includes that a set of resources are based on an azimuth and elevation relative to the network node, and the first TCI candidate set includes each TCI state having a subset of the resources that overlaps with the first TCI state.

In aspect 32, the method of any of aspects 20-31 further includes identifying the first set of TCI states associated with the first TCI state based on a collection of previous measurements of potential TCI states from one or more UEs.

In aspect 33, the method of aspect 32 further includes that the identifying is performed based on machine learning.

In aspect 34, the method of any of aspects 20-27 and 29-33 further includes updating the TCI candidate set to include a second set of TCI states in response to outputting the control information indicating the second TCI state, the second set of TCI states being based on the second TCI state and at least one of a rule, an algorithm, or a table.

Aspect 35 is an apparatus for wireless communication at a network node, comprising means to perform the method of any of aspects 20 to 34.

Aspect 36 in an apparatus for wireless communication at a network node, comprising memory and at least one processor coupled to the memory and configured to perform the method of any of aspects 20 to 34.

In aspect 37, the apparatus of aspect 35 or 36 further includes at least one of a transceiver or an antenna coupled to the at least one processor.

Aspect 38 is a non-transitory computer-readable medium storing computer executable code at a network node, the code when executed by a processor causes the processor to perform the method of any of aspects 20 to 34.

What is claimed is:
1. A method of wireless communication at a user equipment (UE), comprising:
receiving signaling comprised in at least one of radio resource control (RRC) signaling or a medium access control-control element (MAC-CE), wherein the signaling indicates for the UE to apply downlink control information (DCI) triggered TCI candidate set updates;

communicating with a network node based on a first transmission configuration indication (TCI) state;

receiving control information indicating a second TCI state from a TCI candidate set that comprises a list of TCI states that can be activated for future communication, the TCI candidate set including a first set of TCI states having a first association with the first TCI state; and updating, based on the signaling and in response to receiving the control information indicating the second TCI state, the TCI candidate set to include a second set of TCI states that have a second association with the second TCI state.

2. The method of claim 1, further comprising:

receiving, prior to the control information, a configuration indicating the first association between the first set of TCI states and the first TCI state.

3. The method of claim 2, wherein the configuration includes a list of each TCI state associated with the first TCI state or a matrix indicating associated TCI states for each of multiple TCI states.

4. The method of claim 2, wherein a set of resources are based on an azimuth and elevation relative to the network node, and the first set of TCI states includes each TCI state having a subset of the set of resources that overlaps with the first TCI state.

5. The method of claim 2, wherein the configuration further indicates the second association between the second set of TCI states and the second TCI state.

6. The method of claim 5, further comprising:

receiving additional control information indicating a third TCI state from the second set of TCI states associated with the second TCI state.

7. The method of claim 1, wherein the signaling indicates a subset of TCI states for which the UE is to apply the DCI triggered TCI candidate set updates.

8. The method of claim 1, further comprising:

receiving a time indication that indicates a time period for the UE to apply a downlink control information (DCI) triggered TCI candidate set update, wherein the TCI candidate set is updated to the second set of TCI states associated with the second TCI state after the time period indicated to the UE, and wherein the time period is longer than an application time for a DCI triggered TCI candidate set update without the time indication.

9. The method of claim 1, further comprising:

receiving an additional MAC-CE updating the TCI candidate set.

10. The method of claim 9, further comprising:

stopping the DCI triggered TCI candidate set updates in response to receiving the MAC-CE updating the TCI candidate set.

11. The method of claim 1, further comprising:

receiving signaling indicating for the UE to not apply the DCI triggered TCI candidate set updates; and receiving additional control information indicating a third TCI state from the second set of TCI states associated with the second TCI state wherein the UE does not update the TCI candidate set based on an activation of the third TCI state.

12. The method of claim 1, wherein the second set of TCI states are identified based on the second TCI state and at least one of a rule, an algorithm, or a table.

13. An apparatus for wireless communication at a user equipment (UE), comprising:

memory; and at least one processor coupled to the memory and configured to:

receive signaling comprised in at least one of radio resource control (RRC) signaling or a medium access control-control element (MAC-CE), wherein the signaling indicates for the UE to apply downlink control information (DCI) triggered TCI candidate set updates;

communicate with a network node based on a first transmission configuration indication (TCI) state;

receive control information indicating a second TCI state from a TCI candidate set that comprises a list of TCI states that can be activated for future communication, the TCI candidate set including a first set of TCI states having a first association with the first TCI state; and update, based on the signaling and in response to reception of the control information indicating the second TCI state, the TCI candidate set to include a second set of TCI states that have a second association with the second TCI state.

14. The apparatus of claim 13, further comprising:

at least one transceiver, wherein the at least one processor is further configured to:

receive, via the at least one transceiver and prior to the control information, a configuration indicating the first set of TCI states associated with a first TCI state.

15. The apparatus of claim 14, wherein the configuration includes a list of each TCI state associated with the first TCI state or a matrix indicating associated TCI states for each of multiple TCI states.

16. The apparatus of claim 14, wherein a set of resources are based on an azimuth and elevation relative to the network node, and the first set of TCI states includes each TCI state having a subset of the resources that overlaps with the first TCI state.

17. The apparatus of claim 14, wherein the configuration further indicates the second association between the second set of TCI states and the second TCI state.

18. The apparatus of claim 13, wherein the at least one processor is further configured to:

receive additional control information indicating a third TCI state from the second set of TCI states associated with the second TCI state.

19. The apparatus of claim 13, wherein the signaling indicates a subset of TCI states for which the UE is to apply the DCI triggered TCI candidate set updates.

20. The apparatus of claim 13, wherein the at least one processor is further configured to:

receive a time indication that indicates a time period for the UE to apply the DCI triggered TCI candidate set update, wherein the TCI candidate set is updated to the second set of TCI states associated with the second TCI state after the time period indicated to the UE, and wherein the time period is longer than an application time for a DCI triggered TCI candidate set update without the time indication.

21. The apparatus of claim 13, wherein the at least one processor is further configured to:

receive an additional MAC-CE updating the TCI candidate set.

22. The apparatus of claim 21, wherein the at least one processor is further configured to:

stop the DCI triggered TCI candidate set updates in response to receiving the MAC-CE updating the TCI candidate set.

23. The apparatus of claim 13, wherein the at least one processor is further configured to:
  receive signaling indicating for the UE to not apply the DCI triggered TCI candidate set updates; and
  receive additional control information indicating a third TCI state from the second set of TCI states associated with the second TCI state, wherein the UE does not update the TCI candidate set based on an activation of the third TCI state.

24. The apparatus of claim 13, wherein
  the second set of TCI states is based on the second TCI state and at least one of a rule, an algorithm, or a table.

25. An apparatus for wireless communication at network node, comprising:
  memory; and
  at least one processor coupled to the memory and configured to:
    transmit signaling comprised in at least one of radio resource control (RRC) signaling or a medium access control-control element (MAC-CE), wherein the signaling indicates for a user equipment (UE) to apply downlink control information (DCI) triggered TCI candidate set updates;
    communicate with the UE based on a first transmission configuration indication (TCI) state from a TCI candidate set including a first set of TCI states; and
    transmit control information indicating a second TCI state from the TCI candidate set, wherein, based on the signaling, the control information indicating the second TCI state further indicates an update of the TCI candidate set to a second set of TCI states associated with the second TCI state.

26. The apparatus of claim 25, further including at least one transceiver coupled to the at least one processor, wherein the at least one processor is further configured to:
  output additional control information indicating a third TCI state from the second set of TCI states associated with the second TCI state.

27. The apparatus of claim 25, wherein the at least one processor is further configured to:
  identify the first set of TCI states associated with the first TCI state based on a collection of previous measurements of potential TCI states from one or more UEs, wherein an identification is performed based on machine learning.

28. A method of wireless communication at network node, comprising:
  transmitting signaling comprised in at least one of radio resource control (RRC) signaling or a medium access control-control element (MAC-CE), wherein the signaling indicates for a user equipment (UE) to apply downlink control information (DCI) triggered TCI candidate set updates;
  communicating with the UE based on a first transmission configuration indication (TCI) state associated with a first TCI candidate set including a first set of TCI states; and
  transmitting control information indicating a second TCI state from the TCI candidate set, wherein, based on the signaling, the control information indicating the second TCI state further indicates an update of the TCI candidate set to a second set of TCI states associated with the second TCI state.

29. The method of claim 28, further comprising:
  outputting additional control information indicating a third TCI state from the second set of TCI states associated with the second TCI state.

30. The method of claim 28, further comprising:
  identifying the first set of TCI states associated with the first TCI state based on a collection of previous measurements of potential TCI states from one or more UEs, wherein an identification is performed based on machine learning.

* * * * *